US012697938B2

(12) United States Patent
Nimura et al.

(10) Patent No.: US 12,697,938 B2
(45) Date of Patent: Aug. 4, 2026

(54) VEHICLE CONTROL SYSTEM, VEHICLE CONTROL PROGRAM, AND POSITION CONFIRMATION DEVICE

(71) Applicant: DENSO CORPORATION, Kariya-city (JP)

(72) Inventors: Kohei Nimura, Kariya-city (JP); Ryusuke Ishikawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 110 days.

(21) Appl. No.: 18/934,927

(22) Filed: Nov. 1, 2024

(65) Prior Publication Data

US 2025/0058741 A1 Feb. 20, 2025

Related U.S. Application Data

(63) Continuation of application No. PCT/JP2023/017908, filed on May 12, 2023.

(30) Foreign Application Priority Data

May 26, 2022 (JP) ................................. 2022-086238

(51) Int. Cl.
*B60R 25/24* (2013.01)
*B60R 25/01* (2013.01)
*G07C 9/00* (2020.01)

(52) U.S. Cl.
CPC .............. *B60R 25/24* (2013.01); *B60R 25/01* (2013.01); *G07C 9/00309* (2013.01); *B60R 2325/101* (2013.01); *B60R 2325/103* (2013.01); *B60R 2325/20* (2013.01); *G07C 2009/00793* (2013.01); *G07C 2009/00968* (2013.01); *G07C 2209/63* (2013.01)

(58) Field of Classification Search
CPC ... B60R 25/24; B60R 25/01; B60R 2325/101; B60R 2325/103; B60R 2325/20; G07C 9/00309; G07C 2009/00793; G07C 2009/00968; G07C 2209/63; E05B 49/00; Y02D 30/70
See application file for complete search history.

(56) References Cited

U.S. PATENT DOCUMENTS

| | | | | |
|---|---|---|---|---|
| 2017/0136990 | A1* | 5/2017 | Tercero | .................. B60R 25/01 |
| 2018/0361991 | A1* | 12/2018 | Mitsubayashi | ....... B60R 25/245 |

(Continued)

FOREIGN PATENT DOCUMENTS

| | | | | |
|---|---|---|---|---|
| JP | 2019153984 | A | * | 9/2019 |
| JP | 2019191049 | A | * | 10/2019 |

(Continued)

*Primary Examiner* — Adnan Aziz
(74) *Attorney, Agent, or Firm* — Harness, Dickey & Pierce, P.L.C.

(57) ABSTRACT

A vehicle control system including a position confirmation device or a non-transitory computer-readable storage medium storing a vehicle control program detects an occurrence of a predetermined confirmation event, transmits a confirmation request message, receives the message transmitted from the position confirmation device, converts a request content indicated in the received message into a content corresponding to a function of an own device, performs position confirmation, and transmits a result notification message.

12 Claims, 13 Drawing Sheets

(56)  References Cited

U.S. PATENT DOCUMENTS

| | | | | |
|---|---|---|---|---|
| 2021/0076203 | A1* | 3/2021 | Sakamoto | B60R 25/34 |
| 2022/0019669 | A1* | 1/2022 | Morita | G06F 8/656 |
| 2022/0242367 | A1* | 8/2022 | Kato | G07C 9/00309 |
| 2022/0340102 | A1* | 10/2022 | Sugita | E05F 15/70 |

FOREIGN PATENT DOCUMENTS

| | | | |
|---|---|---|---|
| JP | 2020100994 A | 7/2020 |
| JP | 2022119385 A | 8/2022 |

* cited by examiner

POSITION CONFIRMATION PROCESS

DETERMINE POSITION — S01

DO CODE MATCHING — S02

DO RELAY VERIFICATION — S03

END

FIG. 8

<EXAMPLE OF DEVICE FIELD SETTINGS>

| VALUE | DEFINITION |
|-------|------------|
| 0001 | SMART KEY AUTHENTICATION ECU |
| 0010 | MOBILE AUTHENTICATION ECU |
| 0100 | FACE AUTHENTICATION ECU |
| 1000 | FINGERPRINT AUTHENTICATION ECU |
| 0011 | SMART KEY AUTHENTICATION ECU + MOBILE AUTHENTICATION ECU |
| 0110 | MOBILE AUTHENTICATION ECU + FACE AUTHENTICATION ECU |
| 1111 | ALL AUTHENTICATION ECU |

FIG. 9

<EXAMPLE OF RANGE FIELD SETTINGS>

| VALUE | DEFINITION |
|-------|------------|
| 01 | SEARCH ONLY IN VICINITY |
| 10 | SEARCH ONLY IN DISTANCE |
| 11 | SEARCH IN VICINITY + DISTANCE |

FIG. 10

<EXAMPLE OF AREA FIELD SETTING>

| VALUE | DEFINITION |
|---|---|
| 0001 | OUTSIDE VEHICLE |
| 0010 | OUTSIDE DRIVER SEAT |
| 0011 | OUTSIDE PASSENGER SEAT |
| 0100 | OUTSIDE VEHICLE (CLOSE TO REAR SEAT AT RIGHT POSITION) |
| 0101 | OUTSIDE VEHICLE (CLOSE TO REAR SEAT AT LEFT POSITION) |
| 0110 | OUTSIDE TRUNK |
| 0111 | OUTSIDE HOOD |
| 1000 | INSIDE VEHICLE |
| 1001 | CABIN |
| 1010 | INSIDE TRUNK |

FIG. 12

<EXAMPLE OF TARGET FIELD SETTINGS>

| VALUE | DEFINITION |
|---|---|
| 00001 | DEVICE/USER CORRESPONDING TO MANAGEMENT ID=1 |
| 00010 | DEVICE/USER CORRESPONDING TO MANAGEMENT ID=2 |
| 00100 | DEVICE/USER CORRESPONDING TO MANAGEMENT ID=3 |
| 01000 | DEVICE/USER CORRESPONDING TO MANAGEMENT ID=4 |
| 00011 | DEVICE/USER CORRESPONDING TO MANAGEMENT ID=1, 2 |
| 0110 | DEVICE/USER CORRESPONDING TO MANAGEMENT ID=2, 3 |
| 00111 | DEVICE/USER CORRESPONDING TO MANAGEMENT ID=1, 2, 3 |
| 01110 | DEVICE/USER CORRESPONDING TO MANAGEMENT ID=2, 3, 4 |
| 01111 | DEVICE/USER CORRESPONDING TO MANAGEMENT ID=1-4 |
| 11111 | ALL DEVICES/USERS |
| 00000 | NONE |

FIG. 13

<EXAMPLE OF SECURITY FIELD SETTINGS>

| VALUE | DEFINITION |
|-------|------------|
| 01 | LEVEL 1 |
| 10 | LEVEL 2 |
| 11 | LEVEL 3 |

FIG. 14

<EXAMPLE OF MEANS FIELD SETTINGS>

| VALUE | DEFINITION |
|-------|------------|
| 01 | ONLY FIRST MEANS |
| 10 | ONLY SECOND MEANS |
| 11 | FIRST MEANS + SECOND MEANS |

VEHICLE CONTROL SYSTEM, VEHICLE CONTROL PROGRAM, AND POSITION CONFIRMATION DEVICE

CROSS REFERENCE TO RELATED APPLICATION

The present application is a continuation application of International Patent Application No. PCT/JP2023/017908 filed on May 12, 2023, which designated the U.S. and claims the benefit of priority from Japanese Patent Application No. 2022-086238 filed on May 26, 2022. The entire disclosures of all of the above applications are incorporated herein by reference.

TECHNICAL FIELD

The present disclosure relates to a technology for performing vehicle control such as locking and unlocking a vehicle on a condition that it has been confirmed that a user or a key device is present in a predetermined area of the vehicle.

BACKGROUND

In addition to electronic keys, there are in-vehicle systems that allow general-purpose mobile devices such as smartphones to be used as key devices. The electronic key here refers to a dedicated device that functions as a key for a vehicle, and may be called a key fob, smart key, key card, or the like. The key device is a device that functions as a key for a vehicle and is used to authenticate the person who is trying to use the vehicle. The in-vehicle system performs locking or unlocking on the condition that it has been confirmed that the key device is present in a predetermined area.

In an example, a process of confirming that the smart key is present in the predetermined area is often achieved by communicating with the electronic key using low frequency (LF) antennas placed at multiple positions on the vehicle. Additionally, position confirmation of a mobile device may be achieved through wireless communication conforming to Bluetooth (registered trademark).

SUMMARY

A vehicle control system including a position confirmation device or a non-transitory computer-readable storage medium storing a vehicle control program detects an occurrence of a predetermined confirmation event, transmits a confirmation request message, receives the message transmitted from the position confirmation device, converts a request content indicated in the received message into a content corresponding to a function of an own device, performs position confirmation, and transmits a result notification message.

BRIEF DESCRIPTION OF DRAWINGS

FIG. 8 is a diagram showing an example of a value definition in a device field.
FIG. 9 is a diagram showing an example of value definition in a range field.
FIG. 10 is a diagram showing an example of value definition in an area field.
FIG. 12 is a diagram showing an example of a definition of a value in a target field.
FIG. 13 is a diagram showing an example of a definition of a value in a security field.
FIG. 14 is a diagram showing an example of a definition of a value in a means field.

DETAILED DESCRIPTION

Figure 1:
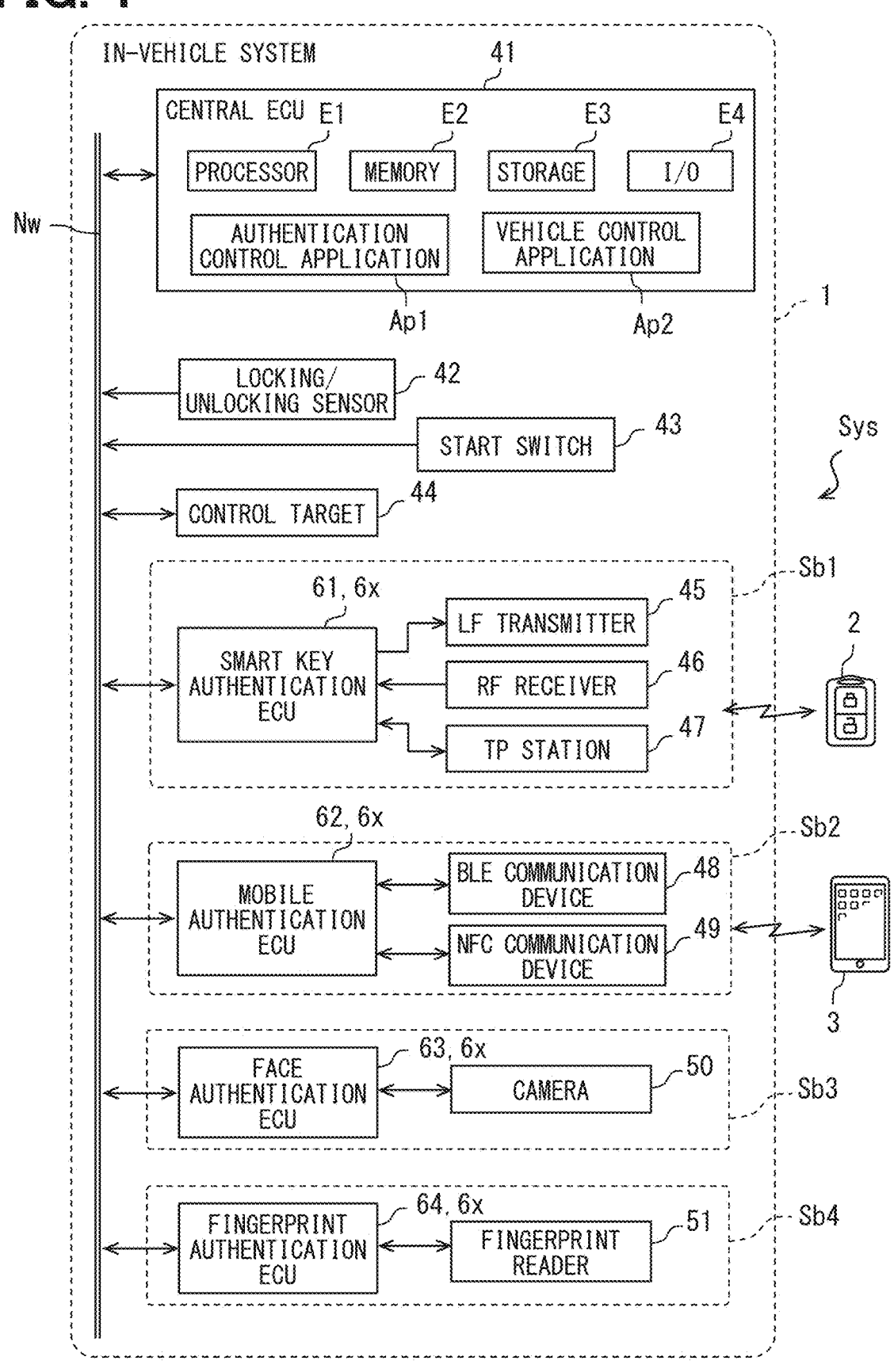
FIG. 1 is a diagram showing an overall view of a vehicle electronic key system.

The specific configuration of a position confirmation device, which is a device for confirming a position of a key device or a user relative to a vehicle, is becoming more diverse. In recent years, in addition to LF signals and Bluetooth (registered trademark), configurations using UWB (Ultra Wide Band) to confirm the position of the key device are being considered. Additionally, the vehicle may be equipped with devices that use face or fingerprint recognition to verify that a user is present at a predetermined position. Furthermore, the device that can be used as the key device is becoming more diverse.

When a vehicle is equipped with multiple types of position confirmation devices having different search targets or determination methods, comprehensive control by one control device may be preferable in viewpoint of security, power consumption, usability, or other factors.

However, different vehicle models may have different variations or types of mounted position confirmation devices. Further, some of the position confirmation devices may be upgraded or added after shipment from the factory, which may result in a change in the combination of position confirmation devices connected to the control device.

In consideration of these circumstances, it is preferable that a system for managing and operating multiple position confirmation devices in an integrated manner have the flexibility for differences in position confirmation devices for each vehicle model and replacement/functional changes of position confirmation devices over time.

The present disclosure provides a vehicle control system, a vehicle control program, and a position confirmation device capable of flexibly adapting to changes in the position confirmation device mounted on the vehicle.

According to one example embodiment, a vehicle control system includes: a plurality of position confirmation devices configured to perform position confirmation of a target registered in advance for each device in a different way; and a central control device configured to execute an application related to vehicle control based on signals from the plurality of position confirmation devices. The central control device is configured to detect an occurrence of a predetermined confirmation event based on the signals from an in-vehicle sensor; and transmit a common confirmation request message indicating a request content to the plurality of position confirmation devices based on detection of the confirmation event. The plurality of position confirmation devices are configured to: receive the confirmation request message transmitted from the central control device; convert a request content indicated in the received confirmation request message into a content corresponding to a function of an own device; perform the position confirmation in a mode according to the request content; and transmit a result notification message indicating a result of the position confirmation back to the central control device. The central control device is configured to determine whether to execute the vehicle control based on the result notification message returned from the plurality of position confirmation devices.

In the above configuration, the central control device transmits a common confirmation request message regardless of the party requesting execution of processing related to target position confirmation. Each position confirmation device converts the content of the confirmation request message into the content appropriate to the function of the own device, then performs the target position confirmation in a manner appropriate to the requested content, and returns the result to the central control device.

According to such a configuration, the central control device does not need to output individual instructions to each position confirmation device. Therefore, it is possible to implement a vehicle control system that has flexibility for differences in position confirmation devices for each vehicle model and replacement/function changes of position confirmation devices over time.

According to another example embodiment, a non-transitory computer-readable storage medium stores a vehicle control program including instructions causing a computer, which is connected to a plurality of position confirmation devices configured to perform position confirmation of a target registered in advance for each device in a different way, to: detect an occurrence of a predetermined confirmation event based on signals from an in-vehicle sensor; transmit a common confirmation request message indicating a desired request content to the plurality of position confirmation devices based on detection of the confirmation event; receive a result notification message indicating a result of the position confirmation based on the confirmation request message from the plurality of position confirmation devices; and determine whether to perform vehicle control according to the detected confirmation event based on the result notification message returned from the plurality of position confirmation devices.

The vehicle control program is a program for causing a computer to function as a central control device included in the vehicle control system. According to a configuration including the above instructions, it is possible to operate a computer as a central control device, and as a result, it is possible to achieve the same effects as a vehicle control system.

Further, according to another example embodiment, a position confirmation device is configured to: perform position confirmation of a target registered in advance based on an instruction signal from a central control device configured to execute an application related to vehicle control; receive a confirmation request message indicating a request content for the position confirmation from the central control device; convert a request content indicated in the received confirmation request message into a content according to a function of an own device; execute the position confirmation in a manner according to the request content; and transmit a result notification message indicating a result of the position confirmation back to the central control device.

The device is the position confirmation device provided in the vehicle control system. The above device can achieve the same effects as a vehicle control system by working in cooperation with the central control device.

Hereinafter, an embodiment of the present disclosure will be described below with reference to the drawings.

Introduction

FIG. 1 is a diagram showing an example of a schematic configuration of a vehicle electronic key system Sys. As shown in FIG. 1, the vehicle electronic key system Sys includes an in-vehicle system 1, multiple smart keys 2, and multiple mobile devices 3. The in-vehicle system 1 is a system mounted on a vehicle Hv. The smart key 2 is a dedicated device serving as an electronic key for the vehicle Hv. The mobile device 3 is a general-purpose information processing terminal carried by the user of the vehicle Hv.

The vehicle Hv is an electric vehicle, more specifically, a hybrid vehicle that can be charged externally, a so-called plug-in hybrid vehicle. The concept of the electric motor vehicle includes a hybrid vehicle and a fuel cell vehicle in addition to an electric vehicle. The hybrid vehicle is a vehicle including an engine and a motor as power sources. Alternatively, the vehicle Hv may be an engine vehicle. The vehicle Hv can be used by multiple users.

The vehicle Hv has a driver seat at the right position. Alternatively, the vehicle Hv may be a vehicle provided with the driver seat at the left position. Front-rear, left-right, and up-down directions described below are defined based on the vehicle Hv when there is no annotation regarding a reference direction (that is, basically). The following description can be appropriately modified so as to conform to the regulation and the conventional practice of the region where the vehicle Hv is used.

The in-vehicle system 1 and the smart key 2 are capable of wireless communication using radio waves in the LF (Low Frequency) band and RF band. The LF band refers to a frequency band below 300 kHz, such as 125 kHz or 134 kHz, and may also include frequencies from 20 KHz to 30 KHz. In the technical field of electronic vehicle keys, the RF band may be understood as a UHF (Ultra High Frequency) band, such as 315 MHz or 920 MHz.

The in-vehicle system 1 is capable of transmitting LF signals and receiving RF signals. The LF signal is a radio signal of a predetermined frequency that belongs to the LF band. The RF signal is a radio signal of a specific frequency that belongs to the RF band. The LF signal is, for example, a wake signal and a challenge signal. The wake signal is an LF signal including a code for transitioning the smart key 2 to an active mode. A challenge signal is an LF signal that requests the return of a response code for authentication. The challenge signal includes a challenge code, which is a random number. The smart key 2 returns response data corresponding to the received LF signal to the in-vehicle system 1 using radio waves in the RF band. In the present disclosure, bidirectional communication using LF signals and RF signals is also referred to as LF-RF communication.

The in-vehicle system 1 and the mobile device 3 are capable of short-range communication. Here, the short-range communication refers to communication conforming to a predetermined short-range wireless communication standard in which a substantial communicable distance is about 5 m to 30 m and a maximum communicable distance is about 100 m. The short-range communication standard may be Bluetooth (registered trademark), Wi-Fi (registered trademark), or the like. The Bluetooth standard may be Bluetooth Classic or Bluetooth Low Energy (BLE).

In the following, the operation of each part will be described using a case where the in-vehicle system 1 and the mobile device 3 each perform wireless communication conforming to the BLE standard (hereinafter, BLE communication) as the short-range communication. The in-vehicle system 1 is set to serve as a master in communication with the mobile device 3, and the mobile device 3 is set to serve as a slave. In another embodiment, the mobile device 3 may be configured to serve as a master in communication with the in-vehicle system 1. In the present disclosure, a wireless signal transmitted and received in BLE communication is also referred to as a BLE signal. The BLE signal transmitted from the smart key 2 or the mobile device 3 to the in-vehicle system 1 includes a device ID (i.e., identification) as information indicating a transmission source.

The smart key 2 and the mobile device 3 are devices that hold a key code for using the vehicle Hv and function as an electronic key for the vehicle Hv using the key code. The key code is data used in an authentication process described later. The key code is data for certifying that the person who attempts to access the vehicle Hv is the user, that is, the validity of the person who attempts to access the vehicle Hv. In the present disclosure, the smart key 2 and the mobile device 3 are collectively referred to as a key device. The key code may differ for each key device.

Incidentally, even in the in-vehicle system 1 configured to allow the mobile device 3 to be used as a key device as in the present disclosure, it is anticipated that the smart key 2 will continue to be sold/distributed as an accessory to the vehicle. It is also assumed that some users may choose to continue using the smart key 2 as a vehicle key rather than the mobile device 3 due to their own preferences. In other words, the in-vehicle system 1 may be required to be capable of communicating with both the smart key 2 and the mobile device 3.

(Smart Key)

The smart key 2 is a dedicated device for the user to operate the vehicle Hv. The smart key 2 can be distributed to the owner together with the vehicle Hv when the vehicle Hv is purchased. The smart key 2 may have various shapes such as a flat rectangular parallelepiped shape, a flat elliptical shape (so-called fob type), and a card shape. The smart key 2 may be referred to as a vehicular mobile device, a key fob, a key card, or an access key. The smart key 2 may be referred to as an accessory key since it is an accessory to the vehicle Hv.

The smart key 2 includes an LF receiver, an RF transmitter, and a key controller. The LF receiver is a circuit for receiving an LF signal. The LF receiver includes an antenna for receiving the LF signal, and a circuit for demodulating the reception signal (a so-called demodulation circuit). The RF transmitter is a component for transmitting an RF signal. The RF transmitter includes an antenna for transmitting the RF signal, and a modulation circuit for modulating a baseband signal input from the key controller.

The key controller is configured as a microcomputer including a CPU (Central Processing Unit), RAM (Random Access Memory), and ROM (Read Only Memory). The key controller may be implemented using an integrated circuit (i.e., IC) or a field-programmable gate array (i.e., FPGA). The ROM stores a key ID, a vehicle ID of a vehicle Hv that can be locked and unlocked with the smart key 2, a key code, and a smart key control program. The key ID is an ID for the in-vehicle system 1 to identify the smart key 2, and a different value is assigned to each smart key 2. The vehicle ID is a unique value for each vehicle.

The key controller is activated when the LF receiver receives a wake signal having a strength equal to or greater than a predetermined threshold, and causes the entire smart key 2 to transition from a sleep mode to the active mode. The active mode is an operation mode in which the key controller and the RF transmitter are operating. The sleep mode is an operation mode that reduces power consumption by limiting the functions that can be executed compared to the active mode. The sleep mode corresponds to an operation mode in which most of the key controller and the RF communication section are stopped.

In the active mode, when the LF receiver receives a challenge code, the key controller generates a response code using the key code stored in the ROM and wirelessly transmits it from the RF transmitter.

In a more preferred embodiment, the smart key 2 is provided with a transponder as a backup for communication with the in-vehicle system 1. The transponder operates using power wirelessly supplied from a TP station 47 included in the in-vehicle system 1, and returns a response code corresponding to a challenge code transmitted from the TP station 47 to the in-vehicle system 1. In other words, the smart key 2 is able to perform wireless communication for authentication with the in-vehicle system 1 using the transponder.

(Mobile Device)

The mobile device 3 is a portable and general-purpose information processing terminal having a BLE communication function. The mobile device 3 may be any communication terminal, such as a smartphone or a wearable device. A wearable device is a device that is worn on the user's body when in use. The wearable device may have a variety of shapes, such as a wristband type, a watch type, a ring type, glasses type, or earphone type.

The mobile device 3 includes a BLE communication unit, an NFC communication unit, and a device controller. The BLE communication unit is a communication module for executing the BLE communication. The NFC communication unit is a communication module for performing NFC communication, which is wireless communication conforming to the NFC (Near Field Communication) standard. The NFC communication here refers to communication in which a communicable distance is from several cm to several tens of cm. The NFC communication can be called near field communication, or touch communication. The near field communication corresponds to a communication method in which the communicable distance is sufficiently shorter than the BLE communication.

The device controller is a computer including a processor, a memory, a storage, and the like. A digital key app, which is an application for causing the mobile device 3 to function as an electronic key for the vehicle Hv, is installed in the storage. Further, the storage stores the key code. The device controller executes processes related to communication connection with the in-vehicle system 1 and authentication.

The mobile device 3 periodically transmits an advertising signal from its BLE communication unit. Furthermore, when the mobile device 3 receives the challenge code through BLE communication with the in-vehicle system 1, the mobile device 3 generates a response code using the key code stored in the storage and returns the response code to the in-vehicle system 1. The mobile device 3 also generates a response code when it receives a challenge code from the in-vehicle system 1 via NFC communication. The mobile device 3 then transmits the generated response code to the in-vehicle system 1 via the NFC communication.

(Configuration of In-Vehicle System)

As shown in FIG. 1, the in-vehicle system 1 includes a central ECU 41, a locking/unlocking sensor 42, a start switch 43, a control target 44, an LF transmitter 45, an RF receiver 46, the TP station 47, a BLE communication device 48, an NFC communication device 49, a camera 50, and a fingerprint reader 51. In addition to the above devices, the in-vehicle system 1 also includes a smart key authentication ECU 61, a mobile authentication ECU 62, a face authentication ECU 63, and a fingerprint authentication ECU 64. The ECU in the member name is an abbreviation for Electronic Control Unit and means an electronic control unit. Moreover, the "TP" in the TP station 47 stands for transponder. Although the term "mobile" in the member name refers to the mobile device 3, the mobile device 3 does not necessarily have to have a calling function.

The central ECU 41 is connected to each of the locking/unlocking sensor 42, the start switch 43, the control object 44, the smart key authentication ECU 61, the mobile authentication ECU 62, the face authentication ECU 63, and the fingerprint authentication ECU 64 via the vehicle interior network Nw so as to be able to communicate with each other. The vehicle interior network Nw is a communication network constructed in the vehicle Hv. As a standard of the vehicle interior network Nw, various standards can be adopted. The smart key authentication ECU 61 may be connected to each of the LF transmitter 45, the RF receiver 46, and the TP station 47 via dedicated communication cables. The mobile authentication ECU 62 is connected to the BLE communication device 48 and the NFC communication device 49 using communication cables so as to be able to communicate with each other. The face authentication ECU 63 is connected to the camera 50 via a video signal line. The fingerprint authentication ECU 64 is connected to the fingerprint reader 51 by wire. The connection mode of the devices illustrated in FIG. 1 is an example, and the specific connection mode of the devices can be appropriately changed.

The in-vehicle system 1 includes a number of subsystems (hereinafter, authentication systems) for verifying the position of a user or a key device. The smart key authentication ECU 61, together with the LF transmitter 45, the RF receiver 46, and the TP station 47, constitute a smart key search system Sb 1, which is a subsystem that confirms the position of the smart key 2. Further, the mobile authentication ECU 62, together with the BLE communication device 48 and the NFC communication device 49, constitutes a mobile search system Sb 2, which is a subsystem that confirms the position of the mobile device 3. The face authentication ECU 63 constitutes a face authentication system Sb3 that authenticates a user based on an image captured by the camera 50. The fingerprint authentication ECU 64 constructs a fingerprint authentication system Sb 4 that performs user authentication based on the fingerprint pattern read by the fingerprint reader 51.

Hereinafter, the smart key authentication ECU 61, the mobile authentication ECU 62, the face authentication ECU 63, and the fingerprint authentication ECU 64 will be collectively referred to as an authentication ECU 6x. The authentication ECU 6x corresponds to a position confirmation device. The position confirmation in the context of the present disclosure essentially involves not just determining position but also verifying (i.e. authenticating) the legitimacy of the device/person which is the determination target. Whether the position confirmation includes the authentication process can be determined according to an instruction from the central ECU 41, in other words, according to the scene in which the position confirmation is performed. Authenticating a target also involves determining its position. The term "authentication" in the following description may be read as "position confirmation" or "search".

The central ECU 41 is an ECU that controls the overall operation of multiple authentication systems. The central ECU 41 corresponds to a central control device. The central ECU 41 is implemented by use of a computer. That is, the central ECU 41 includes a processor E1, a memory E2, a storage E3, an input/output circuit E4 (I/O in the figure), and a bus line connecting these components. In addition, ECUs other than the central ECU 41, such as the smart key authentication ECU 61, the mobile authentication ECU 62, the face authentication ECU 63, and the fingerprint authentication ECU 64, each include a processor, memory, and storage.

The processor E1 is hardware (in other words, an arithmetic core) for calculation processing combined with the memory E2. The processor E1 executes various processes by accessing the memory E2. The memory E2 is a volatile storage medium (for example, a RAM). The storage E3 includes a non-volatile storage medium such as a flash memory. The storage E3 stores a vehicle control program executed by the processor E1. The execution of the vehicle control program by the processor E1 corresponds to execution of a vehicle control method corresponding to the vehicle control program. The input/output circuit E4 is a circuit module for communicating with other devices.

In the storage E3 of the central ECU 41, a user ID, which is identification information unique to each user, is linked to a management ID. The management ID is an identification number that is held by each authentication ECU 6x and is used to link and manage authentication data for the same user. The administration ID may have a one-to-one correspondence with the user ID. Here, as an example, management IDs 1 to 4 are used. The user ID itself may be used as the administration ID.

The central ECU 41 is able to execute multiple application software (hereinafter, referred to as apps). The application is a program that operates on the ECU. The term "application" in the present disclosure can be read as a device/arithmetic core that executes an application. The arithmetic core corresponds to the processor E1. The central ECU 41 executes an authentication control application Ap1 and a vehicle control application Ap2.

The authentication control application Ap1 is an application that controls each authentication system, or more specifically, each authentication ECU 6x. The vehicle control application Ap2 is an application that executes a predetermined vehicle control based on a result of authentication. The vehicle control here may be understood to mean at least one of unlocking, locking, on/off control of the traveling power source, welcome control, remote parking, remote exit, and the like. The welcome control is a control for turning on the vehicle lighting equipment or operating the air conditioning when the user approaches the vehicle Hv. The functions of the authentication control application Ap1 and the vehicle control application Ap2 will be described in detail later.

The locking/unlocking sensor 42 is a touch sensor that allows the user to lock and unlock the doors of the vehicle Hv. The locking/unlocking sensor 42 is provided on an outside door handle provided on each door. The outer door handle is a gripping member provided on an outer side surface of the door for opening and closing the door. The locking/unlocking sensor 42 detects a touch by the user from a change in capacitance or a change in pressure, and outputs an electrical signal indicating this to the mobile authentication ECU 62. The configuration for accepting at least one of the unlock instruction and the lock instruction from the user may be a button-type switch. The button switch may be provided on each door handle instead of the locking/unlocking sensor 42 or together with the locking/unlocking sensor 42.

The start switch 43 is a push switch for the user to switch on/off the traveling power source. The traveling power source is a power source for traveling of the vehicle Hv, and is a system main relay. When the vehicle Hv is an engine vehicle, the ignition power source corresponds to the traveling power source. When the user performs a push operation on the start switch 43, the start switch 43 outputs an electric signal indicating the push operation to the mobile authentication ECU 62. The locking/unlocking sensor 42 and the start switch 43 correspond to examples of in-vehicle sensors.

The control target 44 is an actuator and an electrical device that can be controlled by the central ECU 41. The control target 44 is connected to the central ECU 41. The control target 44 may be a door lock motor, a power source ECU, a speaker, an in-vehicle lighting device, an air conditioner, or a display. The door lock motor is a motor for switching the state (locked, unlocked) of the lock mechanism of each door. The power source ECU is an ECU that controls the on-off state of the traveling power supply mounted on the vehicle Hv. The power source ECU switches the traveling power source from off to on based on a command signal from the central ECU 41. The in-vehicle lighting device may be a headlight, a vehicle interior light, a welcome lamp, or the like. The display may be a liquid crystal display or an organic EL display installed in the vehicle, or a projector that projects an image on a side window of the vehicle or on a road surface.

The LF transmitter 45 is a device that transmits LF signals such as a wake signal and a challenge signal based on an instruction from the mobile authentication ECU 62. The LF transmitter 45 includes an LF transmission antenna and an LF transmission circuit. The LF transmission circuit is a circuit that performs predetermined signal processing such as digital-to-analog conversion, frequency conversion, and modulation.

Figure 2:
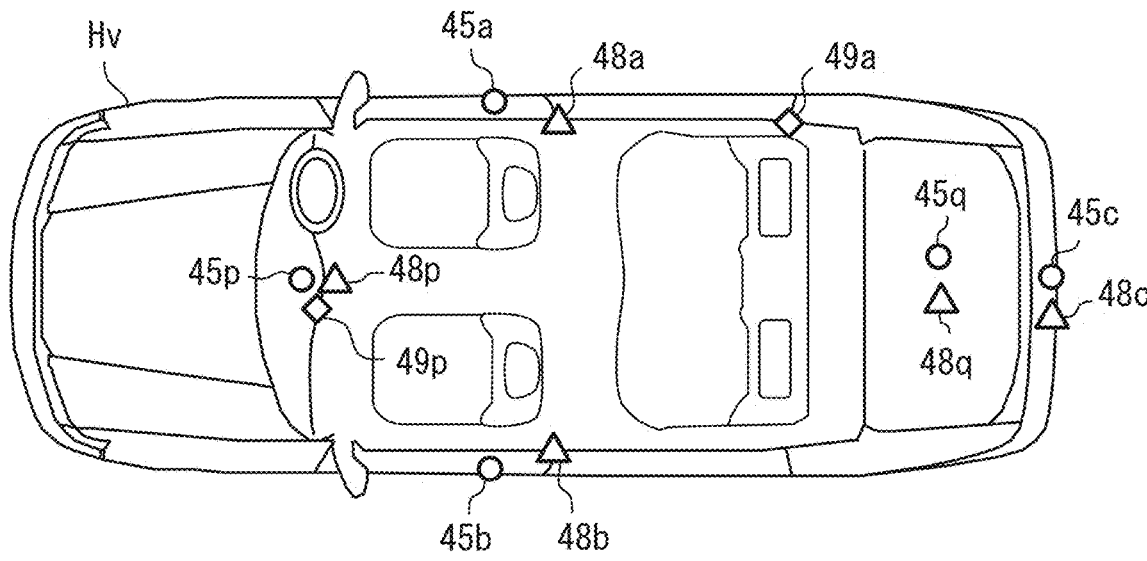
FIG. 2 is a diagram showing an example of an installation position of a communication device.

As shown in FIG. 2, the in-vehicle system 1 of the present embodiment includes LF transmitters 45a, 45b, 45c, 45d, 45e, 45p, and 45q. The LF transmitter 45a is a LF transmitters 45 placed at the outer door handle for a driver seat. The LF transmitter 45b is a LF transmitters 45 placed at the outer door handle for a passenger seat. The LF transmitter 45c is a LF transmitter 45 placed in a vicinity of a trunk door. The LF transmitter 45p is a LF transmitter 45 placed within the cabin. The LF transmitter 45q is a LF transmitter 45 placed in the trunk. The LF transmitter 45p may be placed at a center portion of the instrument panel in the vehicle width direction or in front of the driver seat. The LF transmitter 45q may be placed in the vicinity of the seating surface or feet of the rear seat.

The communication range of the LF transmitter 45a is limited to the vicinity of the driver's door outside the vehicle. The communication range of the LF transmitter 45b is limited to the vicinity of the passenger door outside the vehicle. The communication range of the LF transmitter 45c is limited to the vicinity of the rear bumper outside the vehicle. The communication range of the LF transmitter 45p is limited to within the cabin. The communication range of the LF transmitter 45q is limited to within the trunk.

In addition, as a more preferable embodiment, the exterior LF transmitters such as the LF transmitters 45a, 45b, and 45c are able to switch the transmission power between a basic search level and an extended search level. The basic search level is set to a power value that provides a communication range of within 1 m from the antenna. The extended search level is set to a power value that provides a communication range of up to 6 m from the antenna. The extended search level is provided for determining whether the smart key 2 is present in a vehicle exterior distant area, which will be described later. The communication range (transmission power) of the LF transmitters 45a to 45c is controlled by the smart key authentication ECU 61.

The RF receiver 46 is a module for receiving an RF signal, that is, a response signal from the smart key 2. The RF receiver 46 outputs data corresponding to the reception signal to the smart key authentication ECU 61. The RF receiver 46 is provided on the ceiling or on the instrument panel inside the vehicle. The RF receiver 46 may be built into the smart key authentication ECU 61.

The TP station 47 is configured to communicate with the transponder of the smart key 2, and is implemented using a loop antenna or a coil. The TP station 47 may be located near the start switch 43, on the outer door handle of the driver seat, and on the outer door handle of the trunk. Each TP station 47 operates based on instructions from the smart key authentication ECU 61.

The BLE communication device 48 is a communication module for implementing BLE communication with the mobile device 3. At least one BLE communication device 48 is provided in the vehicle Hv. As an example, as shown in FIG. 2, the in-vehicle system 1 of the present embodiment includes BLE communication devices 48a, 48b, 48c, 48p, and 48q as the BLE communication device 48. The BLE communication device 48a is placed at the B-pillar close to the driver seat, the BLE communication device 48b is placed at the B-pillar close to the passenger seat, and the BLE communication device 48c is placed near the rear bumper. In the present disclosure, the BLE communication devices 48a to 48c are also collectively referred to as vehicle exterior BLE communication devices. The vehicle exterior BLE communication device is a BLE communication device 48 arranged on the exterior surface (side surface or rear surface) of the vehicle Hv. The BLE communication device 48p is placed in the periphery of the start switch 43, and the BLE communication device 48q is placed in the trunk. In the present disclosure, the BLE communication devices 48 arranged inside the vehicle, such as the BLE communication devices 48*p* and 48*q*, are also referred to as vehicle interior BLE communication devices.

While being driven, each BLE communication device 48 outputs data indicating a reception status of a signal from a mobile device 3 registered as a key device to the mobile authentication ECU 62. The reception status includes the presence or absence of reception and the reception strength (Received Signal Strength Indicator/Indication). The operation state (drive/stop) of each BLE communication device 48 is controlled by the mobile authentication ECU 62.

The mobile authentication ECU 62 of the present embodiment uses only one of the multiple BLE communication devices 48 for data communication with the mobile device 3, and uses the other BLE communication devices 48 as communicators for determining the position of the mobile device 3. In one aspect, the BLE communication device 48 for determining the position is a communication device for measuring the reception strength of a signal from the mobile device 3. In the present disclosure, the BLE communication device 48 used for data communication with the mobile device 3 is also referred to as a representative device. The BLE communication device 48 for position determination is also referred to as an observation device in the present disclosure. In the mobile authentication ECU 62 of the present embodiment, as an example, the BLE communication device 48*p* is operated as a representative device, and the others are operated as observation devices. The setting of the representative device may be dynamically changed by the mobile authentication ECU 62.

In the BLE communication, in a state where communication connection between devices is established, data is transmitted and received while sequentially changing multiple channels. That is, frequency hopping is performed during data communication after connection establishment. Therefore, normally, only the representative device can capture the data signal from the mobile device 3. The observation device cannot observe the device signal.

To address such circumstances, the mobile authentication ECU 62 of the present embodiment distributes information indicating the channel to be used for communication from the representative device to the mobile device 3 (hereinafter, channel information) and the device ID to each observation device as reference information. According to the channel information indicated by the reference information, each of the observation devices can recognize which channel among many channels usable in BLE should be used to receive the connection device signal. As a result, the observation device can detect and report the reception strength of the device signal even without communication connection. Of course, in another aspect, each BLE communication device 48 may be configured to individually perform bidirectional communication with the mobile device 3 and transmit the reception strength to the mobile authentication ECU 62.

The NFC communication device 49 is a module for implementing near field communication. The in-vehicle system 1 includes, as NFC communication devices 49, an NFC communication device 49*a* placed on an outer surface of the vehicle Hv, such as a right C-pillar, and an NFC communication device 49*p* placed near the driver seat inside the vehicle. The operating state of each NFC communication device 49 is controlled by the mobile authentication ECU 62.

The camera 50 is a device that generates images used for face recognition of a user. The in-vehicle system 1 includes cameras 50*a*, 50*b*, 50*c*, and 50*p* as the cameras 50. The operation of each camera 50 is driven based on a signal from the face authentication ECU 63.

The camera 50*a* is a camera 50 capable of capturing an image of the face of a user present outside the vehicle and close to the driver seat. The camera 50*a* may be located on the B-pillar, on the roof edge, or on the side mirror close to the driver seat. The camera 50*b* is a camera 50 capable of capturing an image of the face of a user present outside the vehicle and close to the passenger seat. The camera 50*b* may be located on the B-pillar, on the roof edge, or on the side mirror close to the passenger seat. The camera 50*c* is a camera 50 capable of capturing an image of the face of a user existing in front of the trunk. The camera 50*c* may be placed near the top/bottom of the rear window, the trunk door, or the rear bumper. The cameras 50*a* to 50*c* may be cameras for monitoring the periphery and also used for controlling driving assistance/automated driving, and the like. The camera 50*p* is a camera capable of capturing an image of the face of an occupant sitting in the driver seat. The camera 50*p* may be placed on the steering column cover, the upper end of the front window, or the like, with its optical axis facing in the direction of the headrest of the driver seat. The camera 50*p* may be a camera for a driver status monitor that detects the driver state (drowsiness or the like). Each camera 50 may be an optical camera or an infrared camera.

Figure 3:
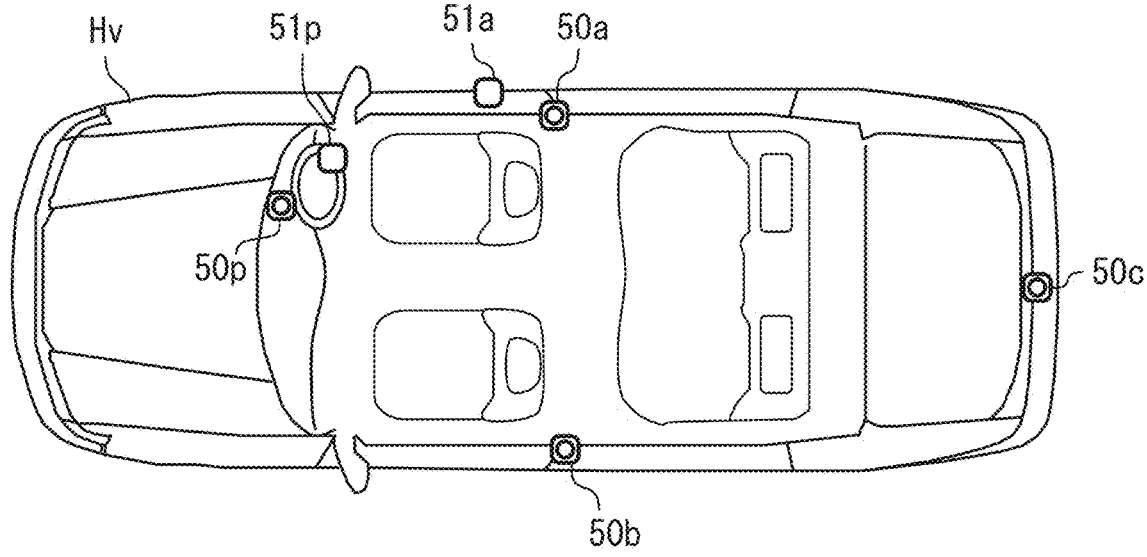
FIG. 3 is a diagram showing an example of the installation positions of a camera and a fingerprint reader.

The fingerprint reader 51 is a device that reads fingerprint information. The fingerprint reader 51 outputs data indicating, for example, a distribution pattern of electrostatic capacitance formed by multiple electrodes, or a distribution pattern of feature points determined based on the distribution pattern. The fingerprint reader 51 may be of an optical type or an ultrasonic type. As shown in FIG. 3, the in-vehicle system 1 includes fingerprint readers 51*a* and 51*p*.

The fingerprint reader 51*a* is placed on the outer surface of the vehicle Hv, such as an outer door handle for the driver seat. The fingerprint reader 51*a* is provided to enable the user outside the vehicle to lock and unlock the vehicle Hv. The fingerprint reader 51*p* is placed around the driver seat inside the vehicle, such as on the steering wheel or the instrument panel. The fingerprint reader 51*p* is provided for the user as the driver to switch the traveling power source from off to on.

The smart key authentication ECU 61 is an ECU that executes a process of searching for the smart key 2 based on an instruction from the central ECU 41. The key ID for each smart key 2 is registered in the storage of the smart key authentication ECU 61 in association with a user ID and an administration ID. The search process for the smart key 2 will be described separately later.

The mobile authentication ECU 62 is an ECU that determines the position of the mobile device 3 relative to the vehicle Hv in cooperation with the BLE communication device 48 and the like. The device ID for each mobile device 3 is registered in the storage of the mobile authentication ECU 62 in association with the management ID and the user ID. The storage 3E stores communication device setting data indicating a mounting position of each BLE communication device 48 in the vehicle Hv. The mounting position of each BLE communication device 48 may be expressed as a point on the vehicle coordinate system. The vehicle coordinate system is a two-dimensional coordinate system that is centered at an arbitrary position on the vehicle Hv and is parallel to both the width direction and the front-rear direction of the vehicle Hv. An X-axis forming the vehicle coordinate system may be set parallel to the vehicle width direction, and a Y-axis may be set parallel to the front-rear direction of the vehicle. The center of the coordinate system may be the center of the vehicle body. The vehicle coordinate system may be a three-dimensional coordinate system including a Z-axis parallel to an up-down direction of the vehicle. The operation of the mobile authentication ECU 62 will be described in detail later.

The face authentication ECU 63 is an ECU that authenticates a user by analyzing a face image included in an image captured by the camera 50. The face authentication ECU 63 stores facial feature data and a user ID for each user in a storage linked to the management ID. The face authentication ECU 63 selectively operates the multiple cameras 50 based on a request from the central ECU 41, and authenticates the user based on the facial features included in the images captured by the cameras 50.

When the face authentication ECU 63 receives instructions by the central ECU 41 to check whether the user is present in the vehicle exterior vicinity area, the face authentication ECU 63 attempts to obtain an image of the user's face using the cameras 50a, 50b, and 50c. A state where user authentication is successful using any one of the cameras 50a, 50b, and 50c corresponds to a state where it has been confirmed that the user is present in vehicle exterior vicinity area. Further, when the face authentication ECU 63 is instructed by the central ECU 41 to check whether a user is present in the cabin, the face authentication ECU 63 attempts to obtain an image of the user's face using the camera 50p.

The fingerprint authentication ECU 64 is an ECU that authenticates a user based on the fingerprint information read by the fingerprint reader 51. The fingerprint authentication ECU 64 stores fingerprint feature data and a user ID for each user in a storage linked to an administration ID. The fingerprint authentication ECU 64 selectively operates multiple fingerprint readers 51 based on a request from the central ECU 41, and identifies the user based on the fingerprint information read by the fingerprint reader 51.

When the fingerprint authentication ECU 64 receives instructions from the central ECU 41 to check whether the user is present in the vehicle exterior vicinity area, the fingerprint authentication ECU 64 attempts to obtain the user fingerprint information using the fingerprint reader 51a. Furthermore, when the fingerprint authentication ECU 64 receives instructions from the central ECU 41 to check whether the user is present in the cabin, the fingerprint authentication ECU 64 attempts to obtain fingerprint information of the user using the fingerprint reader 51p. A state where user authentication using the fingerprint reader 51p has been successful corresponds to a state where it has been confirmed that the user is present within the cabin.

As described above, data indicating the correspondence between the management ID, the user ID, and the authentication data is registered in the storage of each authentication ECU 6x. Each authentication ECU 6x is able to read out a key code and biometric information corresponding to a management ID specified by the central ECU 41 and to confirm the position of a target. The target here refers to the person/thing that is the position confirmation target, such as the user and key devices. In addition, the association between the key device/user and the management ID may be performed, for example, when new user information/key device information is registered in the authentication ECU 6x, by performing two-way communication between the authentication ECU 6x and the central ECU 41.

In addition to the sensors, switches, and ECUs described above, various devices are directly or indirectly connected to the central ECU 41. For example, the central ECU 41 may receive output signals from a courtesy switch, a seating sensor, a seat belt sensor, a brake sensor, and a shift position sensor. The courtesy switch is a switch that outputs a signal indicating whether the door is open or closed. The seating sensor is a sensor that outputs a signal indicating a seating state. The seating sensor may be a pressure sensor placed on the seat surface. The shift position sensor is a sensor that outputs a signal indicating a current shift position.

The central ECU 41 and each authentication ECU 6x acquire various vehicle information indicating the state of the vehicle Hv and user operations on the vehicle Hv via the vehicle interior network Nw. The central ECU 41 acquires the state of the traveling power source (on/off), the open/closed state of each door, the locked/unlocked state of each door, the output level of the locking/unlocking sensor 42, and the output level of the start switch 43. The central ECU 41 may acquire an output value of a brake sensor that detects a depression amount/depression force of the brake pedal and a signal indicating an operating state of a parking brake.

(Smart Key Authentication)

Here, an example of an authentication method of the smart key will be described. The smart key authentication ECU 61 determines the position of the smart key 2 based on the presence or absence of a response from the smart key 2 to the transmitted wake signal. When the response is obtained from the smart key 2 as a result of transmitting the wake signal from the LF transmitter 45a at the basic search level, the smart key authentication ECU 61 tentatively determines that the smart key 2 is present in a driver seat exterior area. When the transmission power of the LF transmitter 45a is set to the basic search level, the driver seat exterior area corresponds to an area outside the vehicle that is within 1 meter from the outer door handle for the driver seat.

In addition, the smart key authentication ECU 61 performs code matching with the response key, which is the smart key 2 that has returned a response to the wake signal, and when the code matching is successful, it determines that the smart key 2 is present in a response acquisition area. The response acquisition area is the communication area of the LF transmitter 45 that transmitted the wake signal that triggered the smart key 2 to return a response signal. In the above example, the driver seat exterior area corresponds to the response acquisition area.

The code matching process is a process for authenticating the communication partner using a challenge-response method. The code matching includes: a process of transmitting a challenge code from an authentication device to an authentication target; a process in which an authenticator device generates a verification code; a process in which the authentication target returns the response code; and a process in which the authentication device determines whether the verification code and the response code match. Here, the smart key authentication ECU 61 corresponds to an authentication device, and the response key corresponds to the authentication target. The challenge code itself may be a different code for each verification, generated using a random number table or a random function.

When the smart key authentication ECU 61 receives a response to the wake signal transmitted from a certain LF transmitter 45, the smart key authentication ECU 61 transmits a challenge signal from that LF transmitter 45 to the responding key as a first process of the code matching process. In addition, as a second process of the code matching process, the smart key authentication ECU 61 generates a verification code in a predetermined procedure using the challenge code and a key code corresponding to the communication partner. Then, in a third process of the code matching process, the smart key authentication ECU 61 compares the response code returned from the communication partner with the verification code. Here, when the verification code and the received response code match, the smart key authentication ECU 61 determines that the authentication is successful.

In this way, authentication of the smart key 2 includes a process of determining the position of the LF transmitter 45 from which the response was obtained, based on the mounting position of the LF transmitter 45, and a process of authenticating the communication partner by code matching. Additionally, authentication of the smart key 2 may include a relay verification process using the reception strength of the LF signal observed by the smart key 2 or the reception strength of a response signal returned from the smart key 2. The relay verification process is a process for determining whether communication between the in-vehicle system 1 and the smart key 2 is being relayed illegally. The smart key authentication ECU 61 may determine that communication between the in-vehicle system 1 and the smart key 2 is being relayed based on the observed reception strength being equal to or greater than a predetermined value.

The smart key authentication ECU 61 selects the LF transmitter 45 that is to transmit the wake signal in accordance with the search target area requested by the central ECU 41. When the central ECU 41 sets the vehicle exterior vicinity area as the search target area, the smart key authentication ECU 61 causes the LF transmitters 45a to 45c to transmit wake signals in order. Further, when the central ECU 41 sets the interior of the vehicle as the search target area, the smart key authentication ECU 61 causes the LF transmitters 45p, 45p to transmit wake signals in sequence.

In addition, the smart key authentication ECU 61 drives the TP station 47 corresponding to the area set by the central ECU 41 as the search target area, and attempts to authenticate the smart key 2. In the present disclosure, the authentication processing using LF-RF communication is also referred to as LF authentication. In addition, the authentication process of the smart key 2 using the TP station 47 is also referred to as transponder authentication.

(Mobile Device)

Here, an example of a method for authenticating the mobile device 3 will be described. As a preparation operation for determining the position of the mobile device 3, the mobile authentication ECU 62 recognizes that the mobile device 3 (and therefore the user) is present in the periphery of the vehicle Hv based on receiving the BLE signal transmitted from the mobile device 3. That is, the mobile authentication ECU 62 may detect the mobile device 3 present in the periphery of the vehicle by a passive scan method.

In addition, the mobile authentication ECU 62 may search for the mobile device 3 by an active scan method involving the transmission of a scan request. The two types of scan methods may be used depending on the scene. For example, the passive scan method may be adopted in a waiting scene while the vehicle is parked, whereas the active scan method may be adopted when a predetermined confirmation event, such as pressing the start switch 43, is detected. The mobile authentication ECU 62 acquires the device ID of the mobile device 3 that is communicatively connected from the BLE communication device 48.

Figure 4:
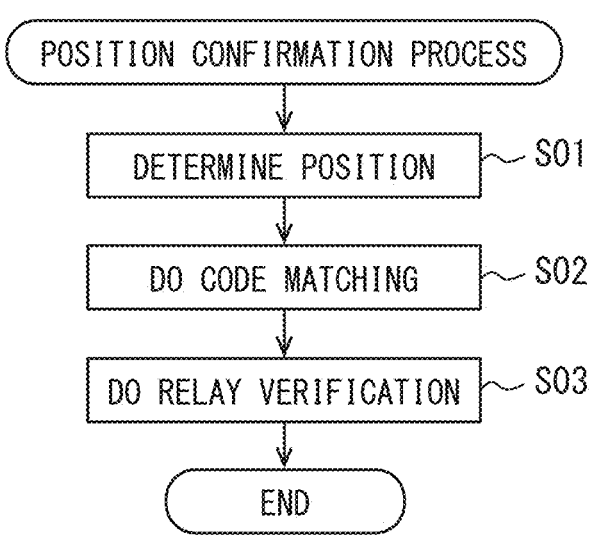
FIG. 4 is a flowchart showing a flow of a position confirmation process.

Similarly to the authentication of the smart key 2, the authentication method of the mobile device 3 also includes a position determination process (S01), a code matching process (S02), and a relay verification process (S03) as shown in FIG. 4. The position determination process is a process of determining the relative position of the mobile device 3 with respect to the vehicle Hv. The code matching process is a process of executing a matching process using the challenge code. The relay verification process is a process of verifying whether unauthorized wireless communication is being performed between the in-vehicle system 1 and the mobile device 3 using a relay.

Figure 5:
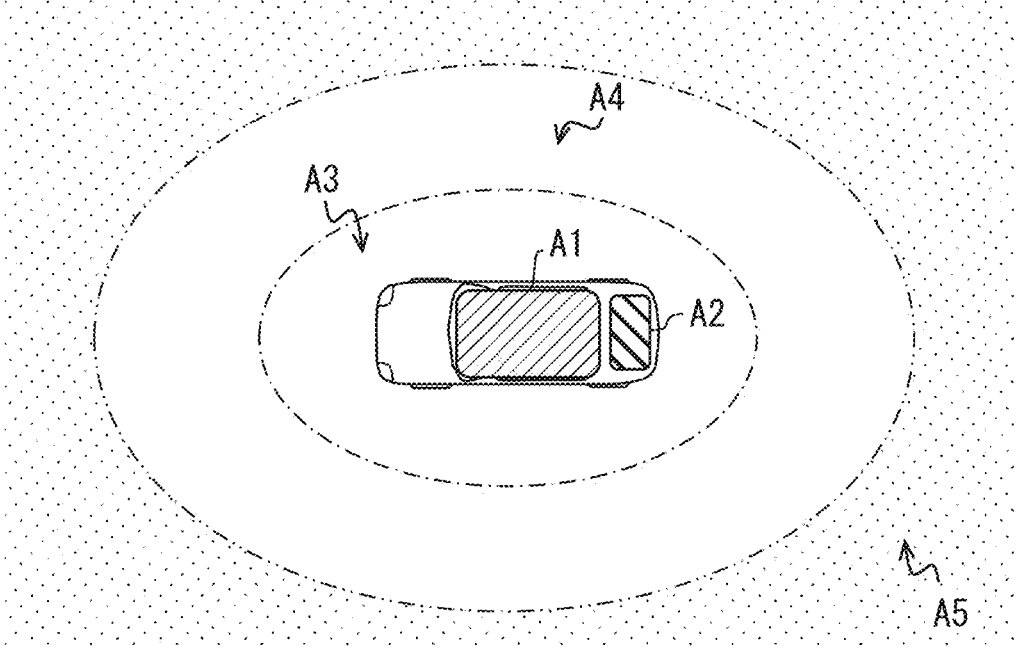
FIG. 5 is a diagram for illustrating an example of area setting.

The position determination process is a process in which the mobile authentication ECU 62 determines the position of a connection device relative to the vehicle Hv based on the reception strength observed by each BLE communication device 48. The connection device refers to a mobile device 3 that is actually connected to and communicates with the mobile authentication ECU 62 among the mobile devices 3 registered in the central ECU 41. Based on the reception strength of the connection device observed by each BLE communication device 48, the mobile authentication ECU 62 determines whether the connection device is present in any of the areas shown in FIG. 5. The areas includes an area inside the cabin, an area inside the trunk, the vehicle exterior vicinity area, the vehicle exterior distant area, or an invalid area. In FIG. 5, A1 indicates the area inside the cabin, A2 indicates the area inside the trunk, A3 indicates the vehicle exterior vicinity area, A4 indicates the vehicle exterior distant area, and A5 indicates the invalid area.

The cabin is a space in which seats such as the driver seat are provided. The cabin may be divided into a front seat area and a rear seat area, for example. The area inside the trunk refers to the space inside the trunk. In the present disclosure, the inside of the cabin and the inside of the trunk are collectively referred to as the vehicle interior.

The vehicle exterior vicinity area refers to an area outside the vehicle that can be considered to be near the vehicle Hv, such as an area within 1 m from the vehicle Hv. The vehicle exterior vicinity area may be referred to as a passive entry area or a locking/unlocking area. A first distance, which is a distance parameter for determining the vicinity of the vehicle Hv, may be 0.75 m, 1.5 m, or the like, instead of 1 m. The first distance corresponds to the size of the communication area when the exterior LF transmitter transmits at the basic search level.

The vehicle exterior distant area is a range outside the vehicle that is within 6 m from the vehicle Hv and is outside the vehicle exterior vicinity area. The invalid area is an area outside the vehicle exterior distant area, that is, an area that is 6 m or more away from the vehicle Hv. The second distance, which is a distance parameter defining the outer boundary of the vehicle exterior distant area, may be 5 m or 8 m instead of 6 m. The vehicle exterior distant area can also be considered as a welcome area, which is an area for initiating welcome control.

The mobile authentication ECU 62 may determine the mobile device 3 that is not connected for communication is in the invalid area. Further, when the mobile authentication ECU 62 determines that the connection device is not present inside the vehicle, in the vehicle exterior vicinity area, or in the vehicle exterior distant area, the mobile authentication ECU 62 may determine that the mobile device 3 is present in the invalid area.

The flow of the code matching process executed by the mobile authentication ECU 62 may be the same as that executed by the smart key authentication ECU 61, except for the communication partner and communication means. The timing at which the mobile authentication ECU 62 executes the code matching process may be the timing at which an authentication request is received from the central ECU 41. As another aspect, the mobile authentication ECU 62 may perform code matching with the connection device when the communication connection between the BLE communication device 48 and the mobile device 3 is established. The mobile authentication ECU 62 may be configured to execute the code matching process at a predetermined period while it is communicatively connected to the mobile device 3.

The relay verification process is a process of determining whether a measured distance value obtained by, for example, causing a representative device to perform communication for measuring distance with the connection device is within a predetermined range. When the measurement distance is equal to or greater than a predetermined value (for example, 6 m), the mobile authentication ECU 62 determines that relaying is being performed.

The distance measurement value here is a parameter indicating the time of flight (ToF: Time of Flight) of a signal transmitted from the mobile device 3 until it is received by the BLE communication device 48. The distance measurement value is a parameter different from the reception strength. Specifically, the distance measurement value is a round-trip time (RTT) or a two-frequency phase difference. Distance measurement communication may be understood as communication for measuring the RTT or the two-frequency phase difference. The distance measurement value indicates the ToF for one way or round trip, and may therefore be referred to as a ToF-related value. The mobile authentication ECU 62 may treat the observed two-frequency phase difference or RTT as a distance measurement value as it is. The distance measurement value may be a parameter obtained by converting the two-frequency phase difference or the RTT into a distance dimension.

In addition, the mobile authentication ECU 62 drives the NFC communication device 49 corresponding to the area set as the search target area by the central ECU 41, and attempts to authenticate the mobile device 3. Hereinafter, the process of authenticating the mobile device 3 using BLE communication will be referred to as BLE authentication. Moreover, the authentication process of the mobile device 3 using NFC communication will be referred to as NFC authentication.

The LF authentication and BLE authentication are wireless authentication processes that can be performed while the user keeps the key device in their bag or clothing pocket. In the present disclosure, wireless authentication that can be performed without the user having to hold the key device, such as LF authentication and BLE authentication, is referred to as smart authentication. On the other hand, transponder authentication and NFC authentication are wireless authentications that require an action such as holding the key device over (or substantially touching) a scanner such as the TP station 47 or the NFC communication device 49. In the present disclosure, transponder authentication and NFC authentication are also referred to as near-contact authentication.

(Function of Central ECU)

Figure 6:
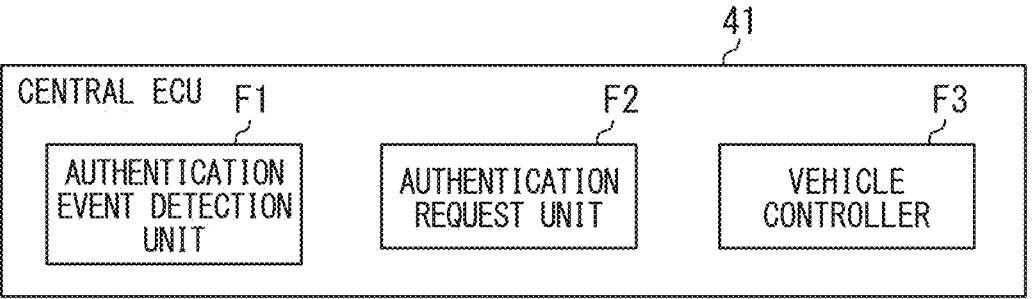
FIG. 6 is a functional block diagram of a central ECU.

Here, the function and operation of the central ECU 41 will be described. The central ECU 41 provides functions corresponding to various functional blocks illustrated in FIG. 6 by executing programs stored in the storage E3. That is, the central ECU 41 includes, as functional units, a confirmation event detection unit F1, an authentication request unit F2, and a vehicle controller F3. The confirmation event detection unit F1 and the authentication request unit F2 are function blocks belonging to the authentication control application Ap1, and the vehicle controller F3 is a function block belonging to the vehicle control application Ap2.

The confirmation event detection unit F1 detects the occurrence of a confirmation event based on various data/signals input from the vehicle interior network Nw. The confirmation event may be an unlocking operation and a locking operation. The unlocking operation is a user operation for unlocking the vehicle Hv. The unlocking operation may be a touch operation on the locking/unlocking sensor 42 when the vehicle Hv is locked. The locking operation is a user operation for locking the vehicle Hv. The locking operation may be a touch operation on the locking/unlocking sensor 42 when the vehicle Hv is unlocked and the traveling power source is set to off. The confirmation event detection unit F1 can detect the unlocking operation and the locking operation as confirmation events based on a combination of the state of the vehicle Hv and the output signal from the locking/unlocking sensor 42.

The confirmation event detection unit F1 may detect a start operation as a confirmation event. The starting operation may be the depression of the start switch 43 with the brake pedal being depressed. The confirmation event detection unit F1 may detect, as a confirmation event, that an open door has been closed. More specifically, when the locking operation of the vehicle Hv is accepted, the state where all the doors are closed may be registered as the confirmation event. Alternatively, the confirmation event detection unit F1 may detect, as the confirmation event, a signal indicating that the brake pedal is depressed, input from a brake pedal sensor.

Alternatively, the in-vehicle system 1 may be configured to detect the user unlocking operation based on an output signal of an infrared sensor that forms a detection area under the door. In this case, the confirmation event detection unit F1 may determine that the confirmation event has occurred when a signal indicating that the user has placed his/her foot over the detection area is input from the infrared sensor.

When the confirmation event is detected by the confirmation event detection unit F1, the authentication request unit F2 outputs the confirmation request packet according to the type of the detected confirmation event and the state of the vehicle Hv to each authentication ECU 6x. The authentication request unit F2 of the present embodiment multicasts the confirmation request packet having the same payload (contents) to each authentication ECU 6x. Of course, the confirmation request packet may be transmitted by unicast rather than by multicast. The authentication request unit F2 may unicast the confirmation request packet having the same payload to each of the multiple authentication ECUs 6x in turn. The configuration of the confirmation request packet will be described separately later. The authentication request unit F2 acquires the result notification packet indicating the result of the position confirmation process from each authentication ECU 6x set as a request destination for position confirmation. The confirmation request packet corresponds to a confirmation request message. Further, the result notification packet corresponds to a result notification message.

The vehicle controller F3 is configured to execute vehicle control according to the contents of the confirmation event, the position where the presence of the device/user has been confirmed, and the state of the vehicle Hv. The vehicle controller F3 locks the vehicle Hv when, as a result of the position confirmation executed in response to the receipt of the locking operation as a trigger, it has been confirmed that the mobile device 3 is not present inside the vehicle and that the key device is present in the vehicle exterior vicinity area. In addition, when the vehicle controller F3 determines that the mobile device 3 is present in the vehicle exterior vicinity area as a result of the position confirmation that is executed in response to the receipt of the unlocking operation, the vehicle controller F3 cooperates with the body ECU 56 to unlock the door. When the vehicle controller F3 determines that the mobile device 3 is present inside the vehicle as a result of the position confirmation triggered by the receipt of a locking operation, the vehicle controller F3 may use a speaker or display to warn that the key device has been locked out.

In addition, even in a case where the vehicle controller F3 cannot confirm the presence of a key device inside the vehicle or in the vehicle exterior vicinity area, when the face authentication ECU 63 or the fingerprint authentication ECU 64 confirms the presence of the user at a predetermined position, the vehicle controller F3 executes vehicle control based on the user position and vehicle status.

(Configuration Example of Confirmation Request Packet)

The payload of a communication packet transmitted and received as an authentication request between the central ECU 41 and the authentication ECU 6x has a fixed format. The confirmation request packet has a format that abstracts the instruction content (requirements) to a level that is independent of the specifications, functions, and characteristics of each authentication ECU 6x. According to this configuration, it is expected to reduce the effort required to modify the program of the central ECU 41 in response to changes in the combination or functions of the authentication ECUs 6x included in the in-vehicle system 1.

Figure 7:
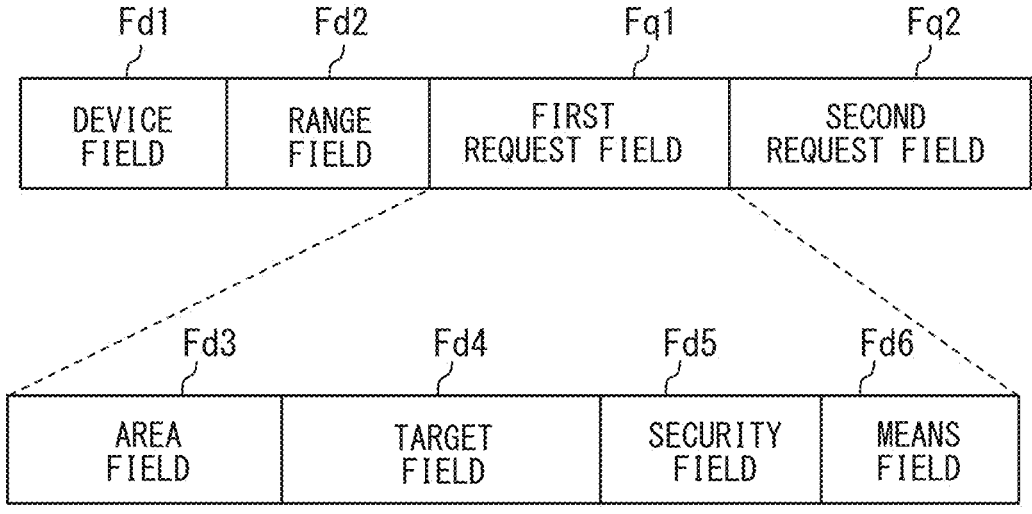
FIG. 7 is a diagram illustrating an example of a format of a payload contained in a confirmation request packet.

As shown in FIG. 7, the payload of the confirmation request packet and the result notification packet includes a device field Fd1, a range field Fd2, a first request field Fq1, and a second request field Fq2. The first request field Fq1 and the second request field Fq2 have the same structure. The first request field Fq1 and the second request field Fq2 each include an area field Fd3, a target field Fd4, a security field Fd5, and a means field Fd6.

Device Field

The device field Fd1 in the confirmation request packet is a field that specifies the request target. The request target refers to a device (authentication ECU 6x) that executes the authentication process. In this example, the device field Fd1 is set to four bits, and a different authentication ECU 6x is assigned to each bit. The first bit of the device field Fd1 is assigned to the smart key authentication ECU 61, the second bit to the mobile authentication ECU 62, the third bit to the face authentication ECU 63, and the fourth bit to the fingerprint authentication ECU 64. In this case, the rightmost bit is the first bit. The central ECU 41 transmits a confirmation request packet in which a bit corresponding to the authentication ECU 6x that is to execute the authentication process is set to "1". For example, when the central ECU 41 requests the smart key authentication ECU 61 and the mobile authentication ECU 62 to execute an authentication process, the central ECU 41 transmits a confirmation request packet in which the device field Fd1 is set to "0011". FIG. 8 shows an example of the correspondence relationship between combinations of request targets for each setting value in the device field Fd1.

In the above example, it becomes necessary to expand the number of bits of the device field Fd1 in proportion to an increase in the number of authentication ECUs 6x. As another aspect, the device field Fd1 may be a field into which a bit string indicating an identification number of an ECU (hereinafter, ECU-ID) indicating the destination/source of a request for authentication processing is inserted. The length of the device field Fd1 may be variable. Multiple ECU-IDs to be requested may be inserted in the device field Fd1.

Furthermore, the destination of the communication packet can be specified by destination address information indicated in the header. Since the authentication process request destination and report source can be identified by the destination address and transmission source address, the device field Fd1 may be omitted. The confirmation request packet does not have to include the device field Fd1. The central ECU 41 may transmit a confirmation request packet having the same contents to multiple authentication ECUs 6x that are the request targets.

Range Field

The range field Fd2 is a field into which a bit value that specifies a search range for key devices/users outside the vehicle is inserted. Here, as an example, the length of the range field Fd2 is set to 2 bits. When the central ECU 41 specifies, for example, only the nearby area as the search range outside the vehicle, it transmits a confirmation request packet in which the range field Fd2 is set to "01". In addition, when the central ECU 41 specifies a range including the vehicle exterior vicinity area and the vehicle exterior vicinity area as the search range outside the vehicle, the central ECU 41 transmits a confirmation request packet in which the range field Fd2 is set to "11". FIG. 9 shows an example of the definition of values of the range field Fd2. A code indicating a specific distance value, such as 1 m or 6 m, may be inserted into the range field Fd2.

Area Field

The area field Fd3 is a field into which a bit value that specifies a search target area for key devices/users is inserted. Here, as an example, the length of the area field Fd3 is set to 4 bits. For example, when the central ECU 41 specifies the outside of the vehicle as the search target area, the central ECU 41 transmits a confirmation request packet in which the range field Fd2 is set to "0001". The extent of the search range outside the vehicle can be defined by the setting value of the range field Fd2 described above. Further, when the central ECU 41 specifies the inside of the vehicle as the search target area, the central ECU 41 transmits a confirmation request packet in which the range field Fd2 is set to "1000". FIG. 10 shows an example of the definition of values in the area field Fd3. In addition, the area outside the trunk in FIG. 10 refers to an area outside the vehicle that is within a predetermined distance from the trunk. The outside of a hood refers to an area outside the vehicle that is within a predetermined distance from the front end of the vehicle.

Figure 11:
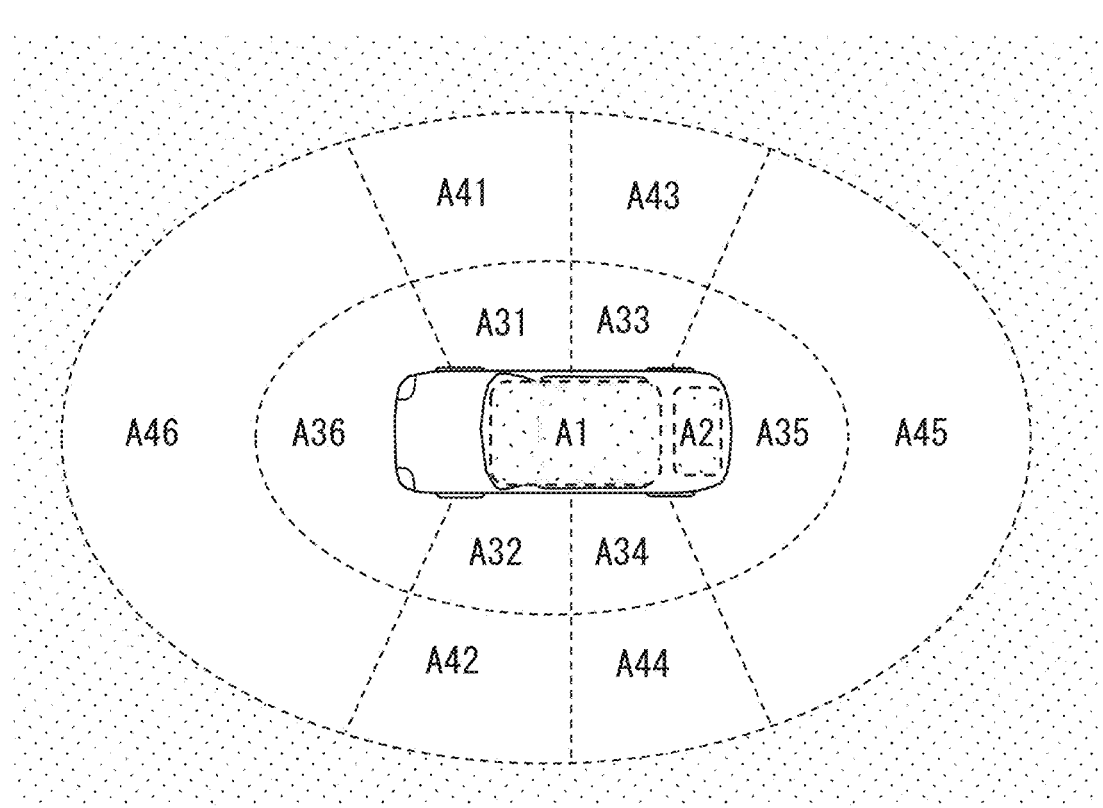
FIG. 11 is a diagram showing an example of setting areas into which the outside of the vehicle is subdivided.

In another aspect, the range field Fd2 may be integrated into the area field Fd3. When the area outside the vehicle is divided into sub-areas A31 to A36 and A41 to A46 as shown in FIG. 11 by a combination of direction and distance, the range field Fd2 can be omitted. In the area field Fd3, a code corresponding to the sub-area that is the search target area may be inserted. The setting example of the search target area shown in FIG. 10 is just an example. The search target area may be divided into only two areas: outside the vehicle and inside the vehicle. The specified division of the search target area may be four areas of: the area inside the cabin, the area inside the trunk, the vehicle exterior vicinity area, and the area outside the vehicle. In addition, the length of the area field Fd3 may be variable. When the length of the area field Fd3 can be variably set, the central ECU 41 may transmit a confirmation request packet in which a code for each area to be searched is inserted in the area field Fd3.

Target Field

The target field Fd4 is a field into which a bit value is inserted that specifies the key device/user that is the target of position confirmation (search). The target is specified using a management ID. Here, as an example, the length of the target field Fd4 is set to 5 bits, and a management ID is assigned to each bit. For example, a management ID=1 is assigned to the first bit, a management ID=2 is assigned to the second bit, a management ID=3 is assigned to the third bit, and a management ID=4 is assigned to the fourth bit. The most significant bit (the leftmost bit) is unassigned. FIG. 12 shows an example of the definition for each setting value of the target field Fd4.

When the central ECU 41 specifies a device/user corresponding to management ID=1 as a search target, it transmits a confirmation request packet in which the target field Fd4 is set to "00001". Further, when the central ECU 41 specifies a device/user corresponding to management ID=1 to 2 as a search target, it transmits a confirmation request packet in which the target field Fd4 is set to "00011". In the present embodiment, since only management IDs up to number 4 are used, a confirmation request packet in which "01111" is set in target field Fd4 corresponds to a confirmation request packet that specifies all devices/users as search targets.

In the above example, the maximum number of management IDs depends on the number of bits of the target field Fd4. Therefore, there may be an upper limit to the number of users that can be registered. In addition, in order to increase the number of users that can be registered, it is necessary to expand the number of bits in the target field Fd4. As one configuration for solving such a necessity, the length of the target field Fd4 may be variable. As another aspect, the target field Fd4 may be a field into which a management ID indicating the authentication target is inserted. In this case, the target field Fd4 has a number of bits corresponding to the length of the management ID. Furthermore, the confirmation request packet may include multiple target fields Fd4 so that multiple authentication targets can be specified. The central ECU 41 may be able to use an all-specified code that is a code that specifies all management IDs. The all-specified code may be a predetermined code, such as a code with all bits set to 1 (11111) or a code with specific control bits set to 1 (10000).

Each authentication ECU 6x operates after converting the management ID specified in the target field Fd4 into a target identification number according to the function of the own device. For example, when the smart key authentication ECU 61 receives a confirmation request packet in which the management ID=1 is set, the smart key authentication ECU 61 searches for the smart key 2 having a key ID linked to the management ID=1. Further, when the mobile authentication ECU 62 receives a confirmation request packet in which the management ID=1 is set, the mobile authentication ECU 62 searches for the mobile device 3 having a device ID linked to the management ID=1. When the face authentication ECU 63 or the fingerprint authentication ECU 64 receives the confirmation request packet in which management ID=1 is set, the face authentication ECU 63 or the fingerprint authentication ECU 64 executes a process for authenticating the user linked to the management ID=1. In this way, each authentication ECU 6x interprets the common instruction content related to the search target individually according to the functions of the own device and operates accordingly.

Security Field

The security field Fd5 is a field into which a bit value is inserted, and the bit value specifies a security level indicating the certainty (safety) of position confirmation. Here, as an example, the central ECU 41 is able to specify three security levels, 1 to 3. Accordingly, the length of the target field Fd4 is set to 2 bits. When the central ECU 41 specifies the level 1 as the security level, it transmits a confirmation request packet in which the security field Fd5 is set to "01". Further, when the central ECU 41 specifies the level 2 as the security level, it transmits a confirmation request packet in which the security field Fd5 is set to "10". When the central ECU 41 specifies the level 3 as the security level, it transmits a confirmation request packet in which the security field Fd5 is set to "11". FIG. 13 shows an example of the definition for each value of the security field Fd5.

The interpretation (operation) of the set value of the security level may be different for each authentication ECU 6x. For example, the security level 2 for wireless authentication ECUs such as the smart key authentication ECU 61 and the mobile authentication ECU 62 may be a level in which code matching is performed but relay verification processing is omitted. The security level 3 for the wireless authentication ECU may be a level at which the code matching and relay verification processes are executed. The security level 1 may be a level where even code matching is not performed. The security level 1 may be a level at which only identification of the communication partner and position determination are performed using the device ID/key ID. The security level for the wireless authentication ECU corresponds to information indicating the necessity of code matching and the necessity of relay determination. Further, the biometric authentication ECUs, such as the face authentication ECU 63 and the fingerprint authentication ECU 64, may execute the identification process with higher accuracy by using more feature amounts as the security level increases. Each authentication ECU 6x may interpret the common instruction content related to the security level individually according to the functions of the own device and operate accordingly.

Means Field

The means field Fd6 is a field into which a bit value specifying an authentication means/authentication method is inserted. Here, as an example, the length of the means field Fd6 is set to 2 bits. When the central ECU 41 specifies the first means as the authentication means, it transmits a confirmation request packet in which the means field Fd6 is set to "01". When the central ECU 41 specifies the second means as the authentication means, the central ECU 41 transmits a confirmation request packet in which the means field Fd6 is set to "10". When specifying that both the first and second authentication means are to be used, the confirmation request packet are transmitted in which the means field Fd6 is set to "11". FIG. 14 is a diagram showing an example of definition for each value of the means field Fd6.

The first means may correspond to a main (normal) authentication means, and the second means may correspond to a sub (backup) authentication means. The first means for the smart key authentication ECU 61 is LF authentication, and the second means is transponder authentication. For the mobile authentication ECU 62, the first means refers to BLE authentication, and the second means refers to NFC authentication. For an authentication ECU 6x having only one authentication means, that authentication means may be applied regardless of the value of the means field Fd6. For example, the face authentication ECU 63 and the fingerprint authentication ECU 64 may execute the authentication process using face image/fingerprint information regardless of the value of the means field Fd6. In this manner, each authentication ECU 6x interprets the common instruction content for the authentication means individually according to the function of the own device and operates accordingly. The means of search can be rephrased as the search method.

The second request field Fq2 is a field for requesting a search for a target in an area other than the area specified in the first request field Fq1. The configuration of the second request field Fq2 is similar to that of the first request field Fq1. When the contents specified in the first request field Fq1 are sufficient, all bits of the second request field Fq2 can be set to 0.

(System Operation Related to Unlocking Control)

Figure 15:
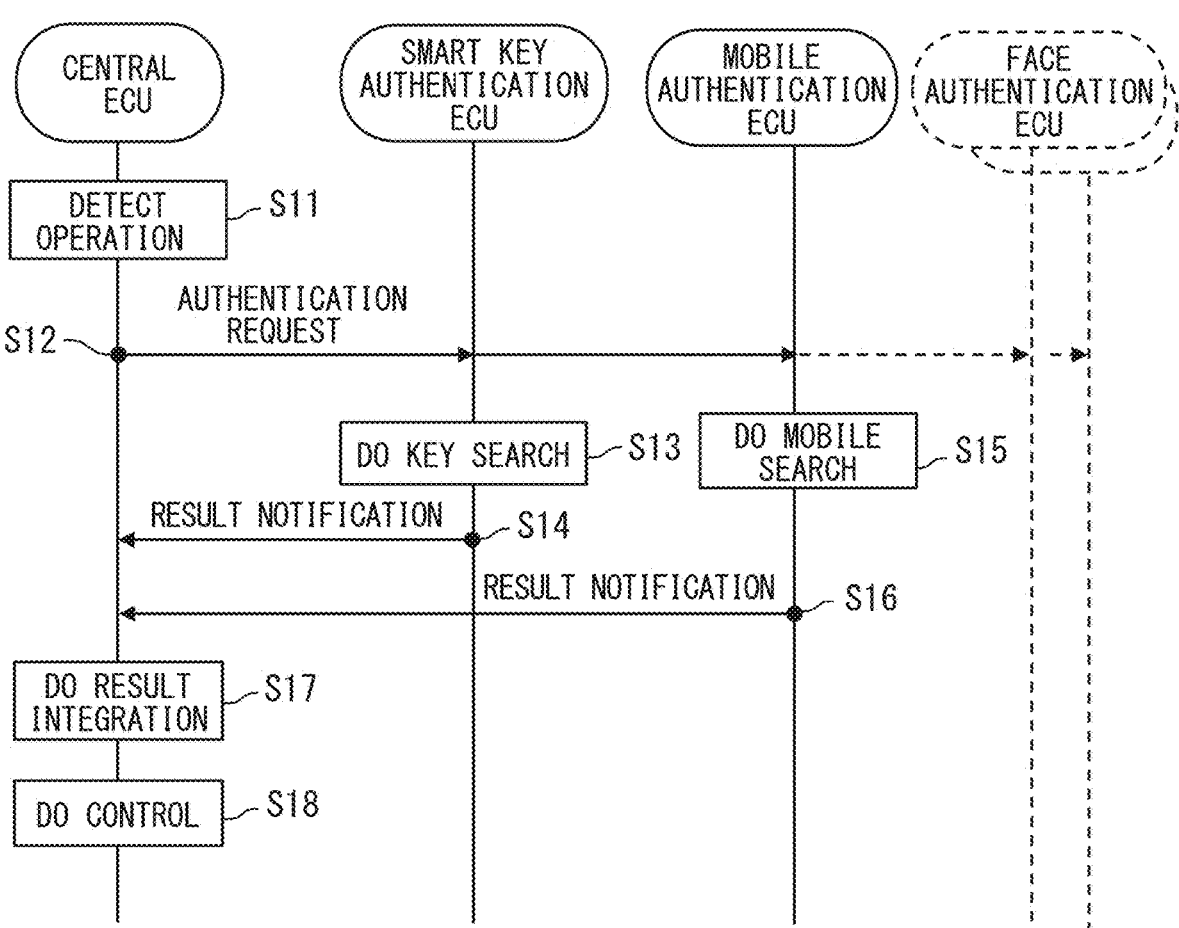
FIG. 15 is a sequence diagram for illustrating the operation of the system at an unlocking operation reception time.

Here, the operation of the central ECU 41 and each authentication ECU 6x when the central ECU 41 receives an unlocking operation will be described with reference to the sequence diagram shown in FIG. 15. The vehicle Hv is assumed to be locked. It is also assumed that the user who performed the unlocking operation is holding the smart key 2 but not the mobile device 3, and is standing within 1 m from the driver door. It is assumed that the key ID of the smart key 2 held by the user is 1, and the corresponding management ID is also set to 1.

Figure 16:
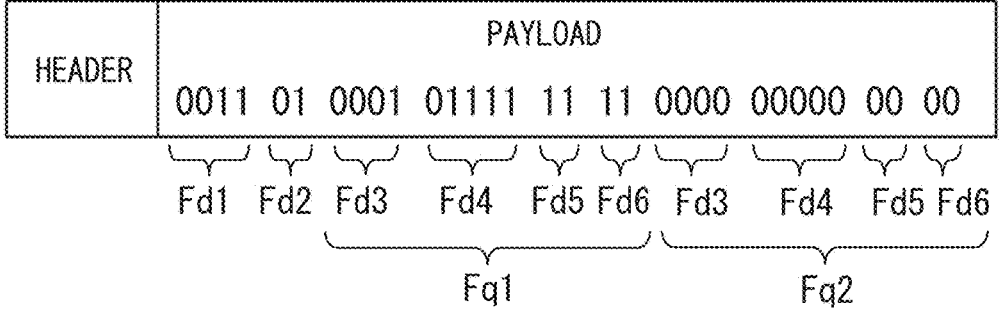
FIG. 16 is a diagram showing an example of a confirmation request packet transmitted by a central ECU in response to an unlocking operation.

First, when the central ECU 41 detects an unlocking operation by a user based on an input signal from the locking/unlocking sensor 42 and the like (S11), the central ECU 41 transmits the confirmation request packet to each authentication ECU 6x. As described above, the central ECU 41 may unicast the confirmation request packet to each authentication ECU 6x in sequence, or may transmit the packet simultaneously in a multicast format. As an example, in response to a user unlocking operation, the central ECU 41 transmits a confirmation request packet in which the smart key authentication ECU 61 and the mobile authentication ECU 62 are set as request targets, as shown in FIG. 16. That is, a confirmation request packet in which "0011" is set in the device field Fd1 is transmitted. The combination of authentication ECUs 6x specified as the request target may be changed as appropriate by a designer or user setting. In response to the user unlocking operation, the central ECU 41 may transmit the confirmation request packet in which all authentication ECUs 6x are set as the request targets. Further, the request target may be dynamically changed depending on the state of the vehicle Hv or the result of the smart authentication process. When there is a history of LF authentication or BLE authentication failure within a fixed period of time (one minute), the central ECU 41 may transmit confirmation request packet that includes the biometric authentication ECU as the request target.

When the central ECU 41 detects the user unlocking operation, it basically specifies the vehicle exterior vicinity area as the search target area, and transmits a confirmation request packet targeting all key devices/users. Specifically, a confirmation request packet is transmitted in which the range field Fd2 is set to "01", the area field Fd3 is set to "0001", and the target field Fd4 is set to "01111". In addition, the search target area at the unlocking operation reception may be only the vehicle exterior vicinity area. In other words, there is no need to search other areas. Therefore, the second request field Fq2 may be blank.

The central ECU 41 selects a security level depending on the scene. For example, when authentication is performed to start use, such as unlocking the vehicle Hv or turning on the traveling power source, the central ECU 41 sets the security level to the highest level, 3 ("11"). On the other hand, the central ECU 41 sets the security level to 2 ("10") when performing authentication to end use, such as locking the vehicle Hv or turning off the traveling power source. As another embodiment, the central ECU 41 may always set the security level to 3 ("11").

The central ECU 41 of the present embodiment always sets the means field Fd6 to "11". Of course, the central ECU 41 may set the means field Fd6 to "10" or "01" in a specific situation.

When each authentication ECU 6x receives the confirmation request packet (S12B), it determines whether its own device is specified as the request target. The authentication ECU 6x that is not set as a request target will not operate and will remain in a standby/sleep state even in a case where it receives the confirmation request packet. In addition, the central ECU 41 may transmit the confirmation request packet only to the request target. The authentication ECU 6x that receives the confirmation request packet in which its own device is specified as the request target searches for the target in a manner according to the content of the request.

Here, the smart key authentication ECU 61 and the mobile authentication ECU 62 respond to the confirmation request packet transmitted in a process S11. On the other hand, the face authentication ECU 63 and the fingerprint authentication ECU 64 do not respond to the confirmation request packet. In addition, authentication ECUs 6x other than the request target, such as the face authentication ECU 63 and the fingerprint authentication ECU 64, may be configured not to perform authentication itself but to return a response (Ack/Nack) indicating that the confirmation request packet has been received.

The smart key authentication ECU 61 executes a search process for the smart key 2 based on the received confirmation request packet (S13). That is, the smart key authentication ECU 61 transmits LF signals in sequence from each LF transmitter 45 that forms a communication area outside the vehicle, and executes the code matching process and relay verification process using the LF transmitter 45 that has obtained the response. The smart key 2, which is the search target, is determined according to the setting value of the target field Fd4. Here, search of all smart keys 2 linked to the vehicle Hv is performed.

The mobile authentication ECU 62 also executes a search process for the mobile device 3 based on the received confirmation request packet (S14). That is, the position determination, the code collation, and the relay determination are performed in this order for all the mobile devices 3 registered in the mobile authentication ECU 62.

Upon completion of the search process, the authentication ECU 6x specified as the target of the request returns a result notification packet indicating the result to the central ECU 41. In the present example, when the smart key authentication ECU 61 and the mobile authentication ECU 62 each complete a series of search processes, they return a result notification packet, which is a packet indicating the result, to the central ECU 41 (S15a, S16a).

Figure 17:
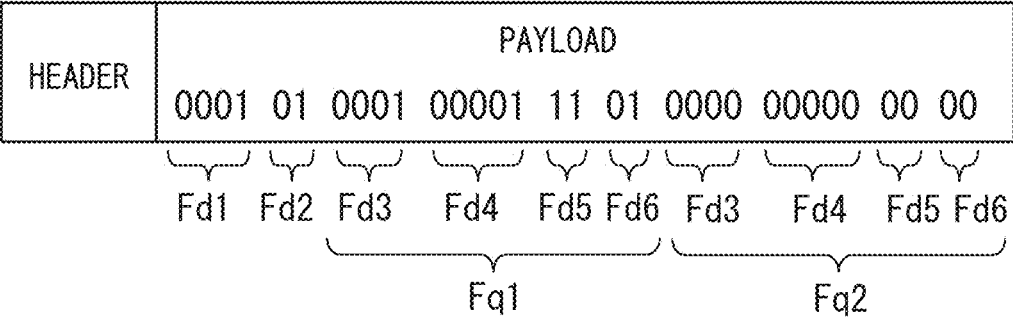
FIG. 17 is a diagram showing an example of a payload of a result notification packet transmitted by a smart key authentication ECU.
Figure 18:
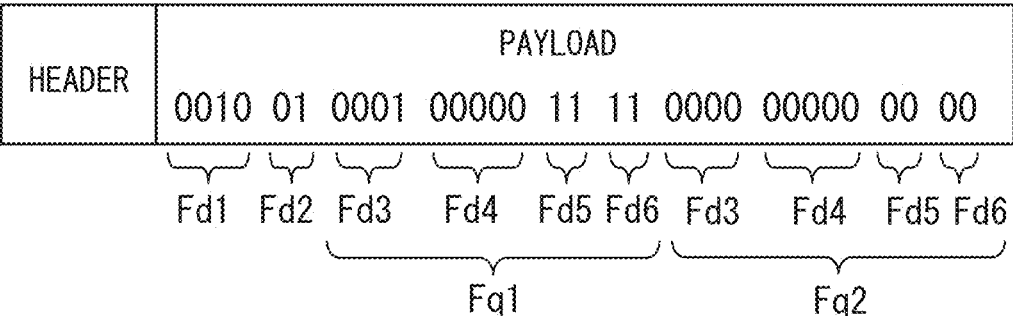
FIG. 18 is a diagram showing an example of a payload of a result notification packet transmitted by the mobile authentication ECU.

The payload of the result notification packet also has a format similar to that of the confirmation request packet, as shown in FIGS. 17 and 18. That is, the result notification packet includes the device field Fd1, the range field Fd2, the area field Fd3, the target field Fd4, the security field Fd5, and the means field Fd6. FIG. 17 shows an example of the payload of a result notification packet transmitted by the smart key authentication ECU 61, and FIG. 18 shows an example of the payload of a result notification packet transmitted by the mobile authentication ECU 62.

The device field Fd1 in the result notification packet indicates the report source. For example, the device field Fd1 of the result notification packet output by the smart key authentication ECU 61 is set to "0001". The range field Fd2 and the area field Fd3 of the result notification packet are set to the range in which the target was actually searched, that is, the same values as the range field Fd2 and area field Fd3 of the confirmation request packet. As another aspect, a bit string (code) indicating the area in which the target was actually found among the specified search target areas may be inserted into the area field Fd3. For example, when the smart key authentication ECU 61 finds the smart key 2 outside the driver seat, the smart key authentication ECU 61 may transmit a result notification packet in which "0010" is set in the area field Fd3.

In the target field Fd4 of the result notification packet, a value corresponding to the management ID of the found target is inserted. For example, when the authentication ECU 6x finds a target corresponding to management ID=2, it transmits a result notification packet in which "00010" is set in the target field Fd4. When no target is found, the authentication ECU 6x transmits a result notification packet in which the target field Fd4 is set to "00000".

In this example, in order to find the smart key 2 with the management ID=1, the smart key authentication ECU 61 transmits a result notification packet in which "00001" is set in the target field Fd4. On the other hand, since the mobile authentication ECU 62 cannot find the mobile device 3, it transmits a result notification packet in which the target field Fd4 is set to "00000".

The security field Fd5 in the result notification packet is set to the same value as the security field Fd5 in the confirmation request packet. The means field Fd6 in the result notification packet is set to a value corresponding to the means used to find the target. For example, when the smart key authentication ECU 61 finds the smart key 2 through LF authentication as the first means, it sets "01" in the means field Fd6. In addition, when the authentication ECU 6x cannot find any targets using the means specified by the central ECU 41, the means field Fd6 is set to the same value (for example, "11") as the means field Fd6 of the confirmation request packet.

After transmitting the confirmation request packet, the central ECU 41 receives result notification packets from each authentication ECU 6x in sequence as needed. In this example, the central ECU 41 receives result notification packets from each of the smart key authentication ECU 61 and the mobile authentication ECU 62 (S15B, S16B). Then, the central ECU 41 integrates the search results from each authentication ECU 6x (S17). The integration with the search results here corresponds to consolidating the positions where the presence of key devices/users of the vehicle Hv has been confirmed.

As described above, in the present example, the result notification packet from the smart key authentication ECU 61 contains data indicating that the smart key 2 linked to the management ID=1 is present in the vehicle exterior vicinity area. Moreover, the result notification packet from the mobile authentication ECU 62 contains data indicating that no mobile device 3 was found. The combined search results become data indicating that the smart key 2 is present in the vehicle exterior vicinity area. Based on the state where the verified smart key 2 is present in the vehicle exterior vicinity area, the central ECU 41 controls the door lock motors to unlock each door. That is, the vehicle Hv is set to the unlocked state (S18).

(System Operation Related to Lock Control)

Next, the operation of the central ECU 41 and each authentication ECU 6x in response to reception of the locking operation by the central ECU 41 will be described. The vehicle Hv is assumed to be unlocked. In addition, the user who performed the locking operation is holding a mobile device 3 corresponding to management ID=2 but not the smart key 2, and is standing within 1 m of the driver door. It is assumed that the smart key 2 and the mobile device 3 have not been left behind in the vehicle.

Figure 19:
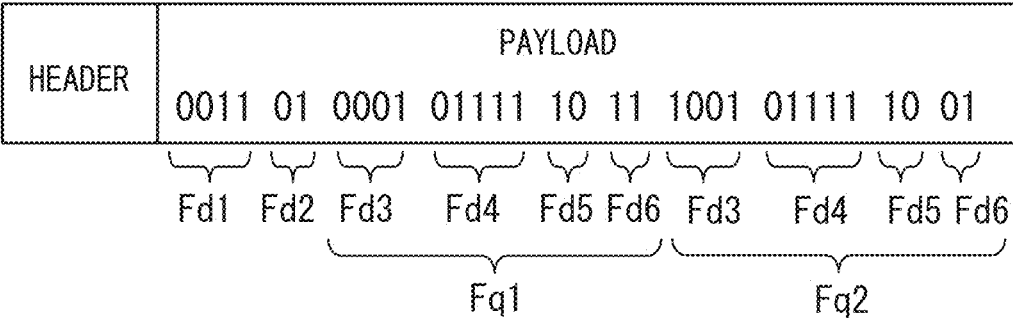
FIG. 19 is a diagram showing an example of the confirmation request packet transmitted by the central ECU in response to a locking operation.

The operating sequence at the reception time of the locking operation is generally the same as that at the reception time of the unlocking operation. When the central ECU 41 detects the locking operation by the user based on an input signal from the locking/unlocking sensor 42 or the like, it transmits the confirmation request packet to each authentication ECU 6x. As an example, in response to the user locking operation, the central ECU 41 transmits the confirmation request packet in which the smart key authentication ECU 61 and the mobile authentication ECU 62 are set as request targets, as shown in FIG. 19. Of course, the combination of authentication ECUs 6x specified as the request target can be changed as appropriate by the designer or user settings. As an example, the set value of the range field Fd2 is "01", but the set value of the range field Fd2 may be "11".

In an authentication request for lock control, it is preferable to include the inside of the cabin as well as the vehicle exterior vicinity area as search targets in order to warn the driver that the key device has been left inside the cabin. For this reason, the central ECU 41 of the present embodiment uses the first request field Fq1 as a field for specifying the vehicle exterior vicinity area as the search target area, and uses the second request field Fq2 as a field for specifying the inside of the cabin as the search target area.

Specifically, the confirmation request packet is transmitted in which the first area field Fd3 is set to "0001" and the second area field Fd3 is set to "1001". The first area field is the area field Fd3 of the first request field Fq1. The second area field is the area field Fd3 of the second request field Fq2. The search target can be a code (such as "01111") that means all key devices/users in both the first and second request fields.

There is little need to execute the relay verification process during authentication for locking. Therefore, the central ECU 41 can set the security level to 2 ("10") in confirmation request packet that is transmitted in response to the locking operation. In authentication outside the vehicle, the means field Fd6 is set to "11" to include not only smart authentication but also near-contact authentication. On the other hand, since it is assumed that no occupants are present in the cabin when the door is locked, the second means, which corresponds to the near-contact authentication, can be omitted. Accordingly, the means field Fd6 of the second request field Fq2 is set to "01".

When each authentication ECU 6x receives a confirmation request packet in which its own device is specified as the request target, it searches for the target in a manner according to the content of the request. For example, the smart key authentication ECU 61 uses an exterior LF transmitter to determine whether the smart key 2 is present in the vehicle exterior vicinity area, and then uses the LF transmitter 45p to determine whether the smart key 2 is present inside the cabin. Further, the mobile authentication ECU 62 performs the code matching of the connection device after performing position determination based on the reception strength.

Figure 20:
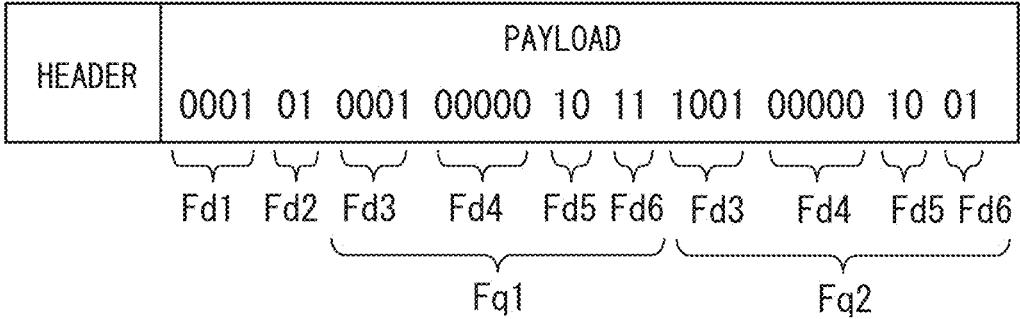
FIG. 20 is a diagram showing an example of a payload of the result notification packet transmitted by the smart key authentication ECU.

When the authentication ECU 6x specified as the request target completes the search process, it returns the result notification packet, which is a packet indicating the result, to the central ECU 41. In the present example, the smart key authentication ECU 61 transmits the result notification packet in which the target fields Fd4 of the first request field Fq1 and the second request field Fq2 are set to "00000" as shown in FIG. 20. In other words, the smart key authentication ECU 61 returns a code indicating that no key device has not been found in either of the two specified target fields Fd4.

Figure 21:
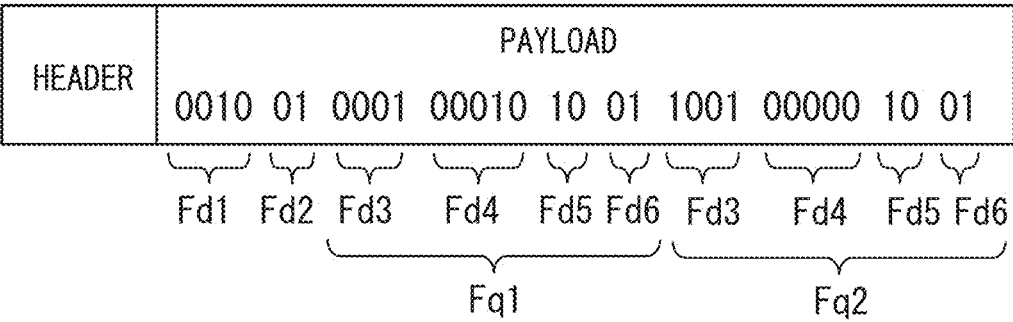
FIG. 21 is a diagram showing an example of the payload of the result notification packet transmitted by the mobile authentication ECU.

Further, the mobile authentication ECU 62 transmits the result notification packet in which the target field Fd4 of the first request field Fq1 is set to "00010" and the target field Fd4 of the second request field Fq2 is set to "00000" as shown in FIG. 21. That is, the mobile authentication ECU 62 places a code indicating that a key device corresponding to the management ID=2 has been found in the first target field Fd4 and returns the code.

When the central ECU 41 receives the result notification packet from each authentication ECUs 6x, it integrates these search results and performs control according to the integrated result. In the present example, the central ECU 41 determines that the mobile device 3 is present in the vehicle exterior vicinity area and that no key device is present inside the cabin, and controls the door lock motors to lock each door. That is, the vehicle Hv is set to a locked state.

In addition, when the search result at the locking time shows detection that the key device is left inside the vehicle, the central ECU 41 may execute a locked-in warning process. The locked-in warning process is a process for notifying the user that the key device is left inside the vehicle using a speaker or a display. In addition, when the search result at the locking time shows detection that the key device is left inside the vehicle, a remaining device invalidation process may be executed on the condition that authentication outside the vehicle is successful. The remaining device invalidation process is a process for invalidating the key device left in the vehicle. The invalidation may mean temporal invalidation of the key function for the vehicle Hv. The invalidation may be performed by excluding the device from communication partners or by setting the device as not being subject to a wireless authentication process. By invalidating, in other words, disabling the remaining device, it is possible to reduce the risk of a third party unauthorizedly unlocking the vehicle Hv.

(Effect)

According to the above configuration, the central ECU 41 may output a common instruction to each authentication ECU 6x. In other words, it is not necessary to output a separate instruction signal to each authentication ECU 6x according to the function of each authentication ECU 6x. This is because each authentication ECU 6x converts the common instruction input from the central ECU 41 into instruction content corresponding to the function of the own device, and then operates.

Therefore, according to the above system configuration, it is possible to reduce the processing load on the central ECU 41. Even when a new authentication ECU 6x is added, it is only necessary to add a candidate for the request target to the central ECU 41. There is no need to significantly modify the program of the central ECU 41 for the change or addition of the authentication ECU 6x. In other words, the above configuration can improve flexibility in accommodating differences in authentication devices for different vehicle models and in accommodating replacement/function changes of authentication devices over time.

While the embodiment of the present disclosure has been described above, the present disclosure is not limited to the embodiment described above, and various modifications to be described below are included in the technical scope of the present disclosure and may be implemented by various modifications within a scope not departing from the spirit of the present disclosure, in addition to the modifications to be described below. The various supplements and modifications described below may be implemented in any suitable combination as long as no technical contradiction occurs. Components having the same or equivalent functions as those of the components described above are denoted by the same reference symbols, and description thereof may be omitted. Further, when only a part of the configuration is mentioned, the above description can be applied to the other parts.

(Supplementary Note for Mounting Positions of Various Communication Devices)

The above-described arrangement of the LF transmitter 45, the TP station 47, the BLE communication device 48, the NFC communication device 49, the camera 50, and the fingerprint reader 51 is an example, and the number and positions of each device may be changed as appropriate. The LF transmitter 45 may also be placed at the exterior door handle for the rear seats, or at the front end of the vehicle. The BLE communication device 48 may be placed at the C-pillar, the ceiling of the vehicle interior, or near the brake pedal.

(Modification of Position Determination Method of Mobile Device)

The mobile authentication ECU 62 may identify the position coordinates of the mobile device 3 relative to the vehicle Hv by combining the distance measurements from the multiple BLE communication devices 48 and the mounting positions of each BLE communication device 48 in the vehicle Hv. The installation position of each BLE communication device 48 is predetermined. Therefore, when the mobile authentication ECU 62 can acquire distance information from three or more BLE communication devices 48 to the mobile device 3, it can identify the position coordinates of the mobile device 3 by three-point positioning/multipoint positioning. The position coordinates of the mobile device 3 can be expressed by a vehicle coordinate system or the like. The mobile authentication ECU 62 may determine the area in which the mobile device 3 is present based on the device position coordinates calculated using the distance measurement value.

(Modification of Communication Method between Mobile Device and In-Vehicle System)

The communication standard between the in-vehicle system 1 and the mobile device 3 may be Wi-Fi (registered trademark), EnOcean (registered trademark), Wi-SUN (Wireless Smart Utility Network), or the like. The Wi-Fi standard may be any standard, such as IEEE 802.11n or IEEE 802.11ax. The IEEE (registered trademark) is an abbreviation for Institute of Electrical and Electronics Engineers, and refers to the American Institute of Electrical and Electronics Engineers.

Alternatively, the communication method between the in-vehicle system 1 and the mobile device 3, in other words, a short-range communication method, may be UWB-IR (Ultra Wide Band-Impulse Radio) using a frequency band of 3 GHz or higher. The short-range communication is carried out using high-frequency radio waves. In the present disclosure, the high frequency radio waves are radio waves of 900 MHz or higher, such as 2.4 GHz. The high-frequency radio waves in the present disclosure is not limited to radio waves of 1 GHz or more, and includes radio waves of a sub-gigahertz band such as 920 MHz.

(Supplementary Note for Division of Roles of Authentication ECU)

Figure 22:
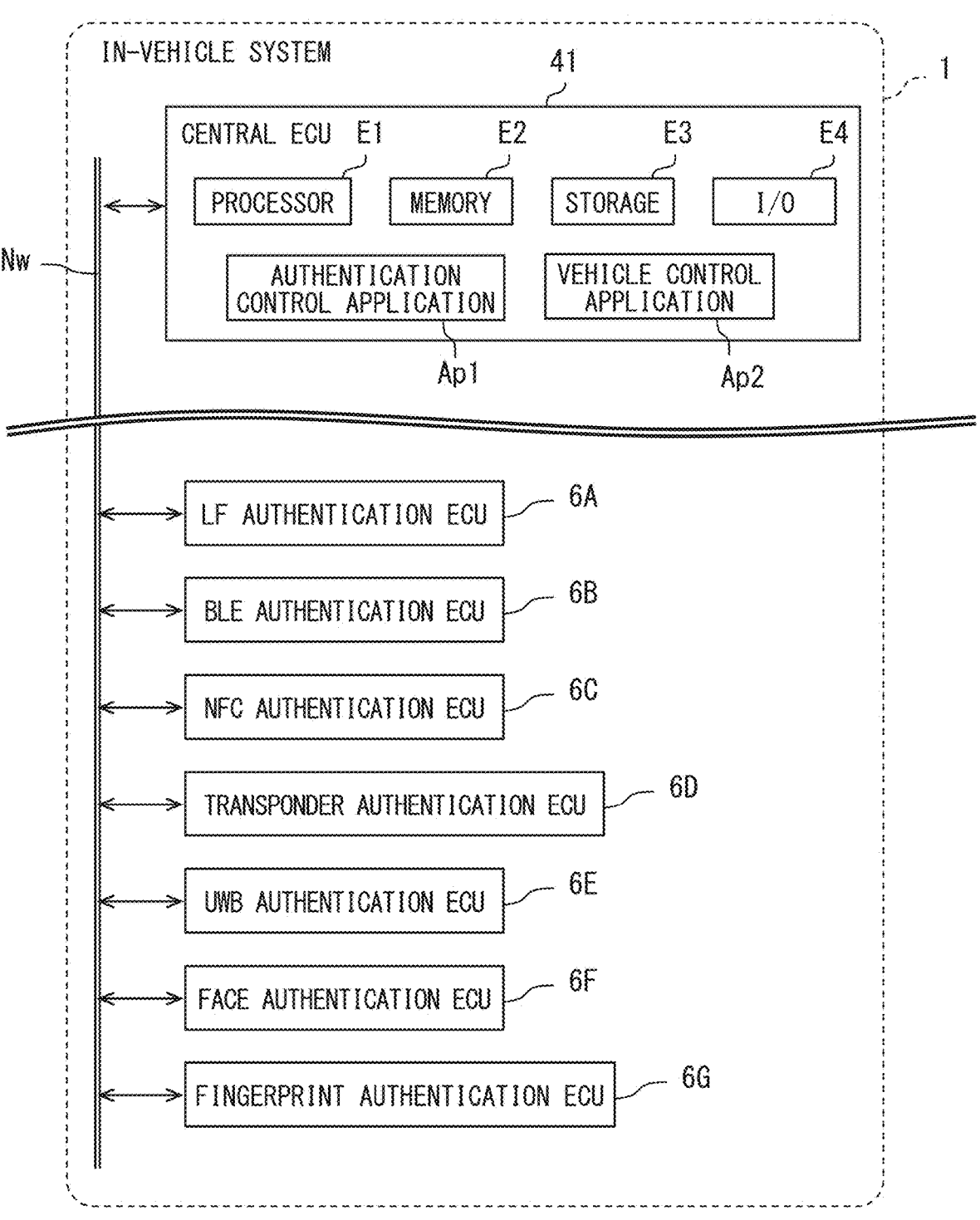
FIG. 22 is a block diagram showing another example of the configuration of an in-vehicle system.

The in-vehicle system 1 may include an authentication ECU 6x not for each device type but for each communication method or for each authentication means. For example, the in-vehicle system 1 may include the authentication ECU 6*x* for each communication method, as shown in FIG. 22. The LF authentication ECU 6A shown in FIG. 22 is an ECU that performs LF authentication, and the BLE authentication ECU 6B is an ECU that performs BLE authentication. The NFC authentication ECU 6C is an ECU that performs NFC authentication, and the transponder authentication ECU 6D is an ECU that performs transponder authentication. The UWB authentication ECU 6E is an ECU that searches for key devices using UWB communication. The face authentication ECU 6F and the fingerprint authentication ECU 6G correspond to the face authentication ECU 63 and the fingerprint authentication ECU 64 described above. The combination and functional arrangement of the authentication ECU 6*x* included in the in-vehicle system 1 can be changed as appropriate.

(Supplementary Note for Distance Measurement Calculation Method)

The RTT is measured as a time from when a response request signal is sent to a communication partner until a response signal is received from the communication partner. The BLE communication device 48 may use, as the RTT, a value obtained by executing a predetermined correction process on the elapsed time from actually transmitting a signal to actually receiving it. The correction process may be subtraction of an estimated value of the response processing time that occurs in the mobile device 3, or subtraction of an estimated value of the delay time that may occur in the BLE communication device 48. The two-frequency phase difference is a parameter specified by the BLE communication device 48 and the mobile device 3 transmitting and receiving a continuous wave (CW) signal, and is a difference of a transmission and reception phase difference observed at each of two frequencies. The two-frequency phase difference corresponds to a displacement amount of the transmission and reception phase difference due to a change in frequency.

The BLE communication device 48 may calculate and output the two-frequency phase difference for each combination of frequencies used in BLE communication. The function of generating (calculating) the distance measurement value may be built into the BLE communication device 48 or may be provided in the mobile authentication ECU 62. The division of functions between the BLE communication device 48 and the mobile authentication ECU 62 may be changed as appropriate.

(Applicable Vehicle Variations)

The vehicle Hv described above is a four-wheeled automobile owned by an individual as an example. The users of the vehicle Hv may be the owner and his/her family/friends. The vehicle Hv may be a company vehicle owned by a company organization or an official vehicle owned by a public institution. When the vehicle Hv is a company vehicle or an official vehicle, the user may be a person belonging to an organization that manages the vehicle Hv. The vehicle Hv may be a vehicle provided for a rental service (so-called rental car) or a vehicle provided for a car-sharing service (so-called shared car). When the vehicle Hv is a vehicle provided for the above-described service, the user may be a person who has made a contract for use of the service and has an authority to temporarily use the vehicle Hv based on a use reservation of the service.

(First Note)

The present specification discloses a plurality of technical ideas listed below and a plurality of combinations thereof. The scope of the present disclosure also includes a position confirmation device, a position confirmation method, a program including instructions for causing a computer to execute the following processes, and a storage medium having the program recorded thereon, which are compatible with the vehicle control system described below.

(Second Note)

The various flowcharts shown in the present disclosure are all examples, and the number of processes constituting the flowcharts and the execution order of the processes can be changed as appropriate. Further, the device, the system and the method therefor which have been described in the present disclosure may be also implemented by a dedicated computer which constitutes a processor programmed to execute one or more functions concretized by computer programs. The device and the method described in the present disclosure may be also implemented by a dedicated hardware logic circuit. Further, the device and the method described in the present disclosure may be also implemented by one or more dedicated computers which are constituted by combinations of a processor for executing computer programs and one or more hardware logic circuits. As the processor (arithmetic core), a CPU, an MPU, a GPU, a DFP (Data Flow Processor), or the like can be adopted. The computer of the present disclosure may be implemented using a system-on-chip (SoC), an IC, an FPGA, or the like. The concept of IC also includes ASIC (Application Specific Integrated Circuit). Further, the computer program may be stored in a computer-readable non-transitionary tangible storage medium as an instruction executed by the computer. As a program storage medium, an HDD (Hard-disk Drive), an SSD (Solid State Drive), a flash memory, or the like can be adopted.

What is claimed is:

1. A vehicle control system comprising:
a plurality of position confirmation devices configured to perform position confirmation of a target registered in advance for each device in a different way; and
a central control device configured to execute an application related to vehicle control based on signals from the plurality of position confirmation devices,
wherein
the central control device is configured to
detect an occurrence of a predetermined confirmation event based on the signals from an in-vehicle sensor; and
transmit a common confirmation request message indicating a request content to the plurality of position confirmation devices based on detection of the confirmation event,
the plurality of position confirmation devices are configured to:
receive the confirmation request message transmitted from the central control device;
convert a request content indicated in the received confirmation request message into a content corresponding to a function of an own device;
perform the position confirmation in a mode according to the request content; and
transmit a result notification message indicating a result of the position confirmation back to the central control device, and
the central control device is configured to determine whether to execute the vehicle control based on the result notification message returned from the plurality of position confirmation devices.

2. The vehicle control system according to claim 1, wherein
the target includes a plurality of targets, the plurality of targets are registered in the vehicle control system, the confirmation request message includes a code for specifying a target that is a search target among the plurality of targets, and the plurality of position confirmation devices are configured to search for the target specified in the confirmation request message.

3. The vehicle control system according to claim 1, wherein the confirmation request message includes a code of a search target area that is an area for search of the target, and the plurality of position confirmation devices are configured to determine whether the target is present in the search target area specified in the confirmation request message.

4. The vehicle control system according to claim 1, wherein the confirmation request message includes a code specifying a security level of the position confirmation, and the plurality of position confirmation devices are configured to perform the position confirmation in a manner according to the specified security level.

5. The vehicle control system according to claim 1, wherein the plurality of position confirmation devices include a position confirmation device configured to search for the target by a plurality of search methods, and the confirmation request message includes information specifying a search method of the target.

6. The vehicle control system according to claim 1, wherein the confirmation request message includes a code for specifying a request target that is a position confirmation device to be operated among the plurality of position confirmation devices, the position confirmation device specified as the request target in the confirmation request message is configured to perform the position confirmation according to a content indicated in the confirmation request message, and the position confirmation device that is not specified as the request target in the confirmation request message is configured not to perform the position confirmation.

7. The vehicle control system according to claim 1, wherein a smart key and a mobile device are registered as a key device that functions as a key for the vehicle by wireless communication with a communication device mounted on the vehicle, the confirmation request message includes a code specifying a type of the key device that is a search target, the plurality of position confirmation devices capable of searching for the key device having the type specified in the confirmation request message is configured to perform the position confirmation according to the content indicated in the confirmation request message, and the position confirmation device incapable of searching for the key device having the type specified in the confirmation request message, is configured not to perform the position confirmation.

8. The vehicle control system according to claim 1, wherein the result notification message includes information of a found target.

9. The vehicle control system according to claim 1, wherein the result notification message includes information of an area in which the target has been found.

10. The vehicle control system according to claim 3, wherein the confirmation request message is capable of setting two or more search target areas and specifying the target for each search target area.

11. A non-transitory computer-readable storage medium storing a vehicle control program including instructions causing a computer, which is connected to a plurality of position confirmation devices configured to perform position confirmation of a target registered in advance for each device in a different way, to:

detect an occurrence of a predetermined confirmation event based on signals from an in-vehicle sensor;

transmit a common confirmation request message indicating a desired request content to the plurality of position confirmation devices based on detection of the confirmation event;

receive a result notification message indicating a result of the position confirmation based on the confirmation request message from the plurality of position confirmation devices; and determine whether to perform vehicle control according to the detected confirmation event based on the result notification message returned from the plurality of position confirmation devices.

12. A position confirmation device configured to:

perform position confirmation of a target registered in advance based on an instruction signal from a central control device configured to execute an application related to vehicle control;

receive a confirmation request message indicating a request content for the position confirmation from the central control device;

convert a request content indicated in the received confirmation request message into a content according to a function of an own device;

execute the position confirmation in a manner according to the request content; and transmit a result notification message indicating a result of the position confirmation back to the central control device.

\* \* \* \* \*